United States Patent [19]

Hayashi

[11] Patent Number: 5,949,966
[45] Date of Patent: Sep. 7, 1999

[54] MULTIPLE TONAL RANGE IMAGE PROCESSING SYSTEM

[75] Inventor: Toshihiro Hayashi, Nagano, Japan

[73] Assignee: Seiko Epson Corporation, Tokyo, Japan

[21] Appl. No.: 08/959,720

[22] Filed: Oct. 28, 1997

Related U.S. Application Data

[63] Continuation of application No. 08/322,346, Oct. 13, 1994, abandoned.

[30]   Foreign Application Priority Data

Aug. 24, 1994   [JP]   Japan .................................... 6-199750

[51] Int. Cl.$^6$ ....................................................... H04N 1/40
[52] U.S. Cl. ............................ 395/109; 358/457; 358/456
[58] Field of Search ..................................... 395/109, 112, 395/117; 358/457, 455, 456, 465, 453; 382/205, 209, 270, 195

[56]   References Cited

U.S. PATENT DOCUMENTS

| 4,495,522 | 1/1985 | Matsunawa et al. ..................... 358/457 |
| 4,517,605 | 5/1985 | Yokomizo ................................ 358/457 |
| 4,709,274 | 11/1987 | Tanioka .................................... 358/457 |
| 4,937,677 | 6/1990 | van Dorsselaer ........................ 358/457 |
| 5,130,821 | 7/1992 | Ng ............................................ 358/457 |
| 5,465,165 | 11/1995 | Tanio et al. .............................. 395/109 |
| 5,473,734 | 12/1995 | Maskell et al. .......................... 395/109 |
| 5,742,317 | 4/1998 | Kashihara ................................ 358/457 |
| 5,754,311 | 5/1998 | Ray ......................................... 358/457 |

FOREIGN PATENT DOCUMENTS

| 0493935A2 | 7/1992 | European Pat. Off. . |
| 0 580 151 A2 | 1/1994 | European Pat. Off. . |
| 2101836 | 1/1983 | United Kingdom . |
| 2 246 046 | 1/1992 | United Kingdom . |

*Primary Examiner*—Edward L. Coles
*Assistant Examiner*—Cheukfan Lee
*Attorney, Agent, or Firm*—Morgan, Lewis & Bockius LLP

[57]   ABSTRACT

A host computer converts an entered gray scale image into a raster image expressing multiple tonal ranges, using an intermediate spot pattern determined in advance. Here, the intermediate spot pattern is a spot pattern composed of pixels which can take only binary value densities with information indicating tonal ranges embedded in the manner of arrangement of the pixels in the spot pattern. Therefore, this raster image logically expresses a large number of tonal ranges which cannot be actually expressed with pixels in binary value densities. A printer receives this raster image from the host computer and converts the intermediate spot pattern in this raster image into an output spot pattern which can assume tertiary values or more in density, thereby printing out a half-tone image actually expressing multiple tonal ranges.

19 Claims, 23 Drawing Sheets

FIG. 2(a)

| DENSITY | INTERMEDIATE SPOT PATTERN | OUTPUT SPOT PATTERN |
|---|---|---|
| 1 | | |
| 1+1/4 | | |
| 1+2/4 | | |
| 1+3/4 | | |

FIG. 2(b)

| DENSITY | INTERMEDIATE SPOT PATTERN | OUTPUT SPOT PATTERN |
|---|---|---|
| 2 | | |
| 2+1/4 | | |
| 2+2/4 | | |
| 2+3/4 | | |

FIG. 2(c)

| DENSITY | INTERMEDIATE SPOT PATTERN | OUTPUT SPOT PATTERN |
|---|---|---|
| 3 | | |
| 3+1/4 | | |
| 3+2/4 | | |
| 3+3/4 | | |

FIG. 2(d)

| DENSITY | INTERMEDIATE SPOT PATTERN | OUTPUT SPOT PATTERN |
|---|---|---|
| 4 | | |
| 4+1/4 | | |
| 4+2/4 | | |
| 4+3/4 | | |

FIG. 3(a)
| DENSITY | INTERMEDIATE SPOT PATTERN | OUTPUT SPOT PATTERN |
|---|---|---|
| 5 | 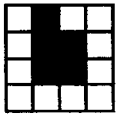 | 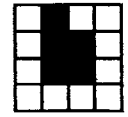 |
| 5+1/4 | 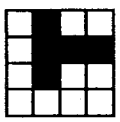 | 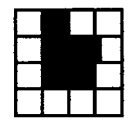 |
| 5+2/4 | 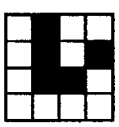 |  |
| 5+3/4 | 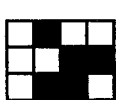 | 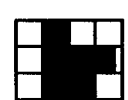 |
FIG. 3(b)
| DENSITY | INTERMEDIATE SPOT PATTERN | OUTPUT SPOT PATTERN |
|---|---|---|
| 6 | 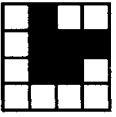 | 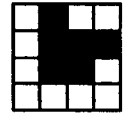 |
| 6+1/4 | 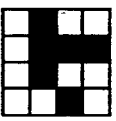 | 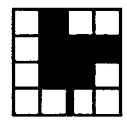 |
| 6+2/4 | 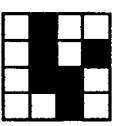 | 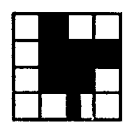 |
| 6+3/4 | 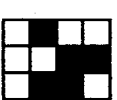 |  |
FIG. 3(c)
| DENSITY | INTERMEDIATE SPOT PATTERN | OUTPUT SPOT PATTERN |
|---|---|---|
| 7 | 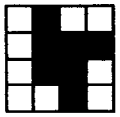 | 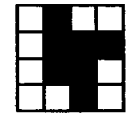 |
| 7+1/4 | 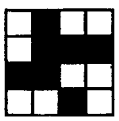 | 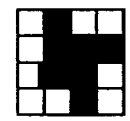 |
| 7+2/4 |  |  |
| 7+3/4 | 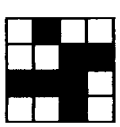 |  |
FIG. 3(d)
| DENSITY | INTERMEDIATE SPOT PATTERN | OUTPUT SPOT PATTERN |
|---|---|---|
| 8 | 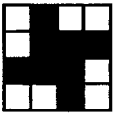 | 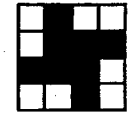 |
| 8+1/4 | 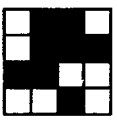 | 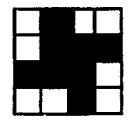 |
| 8+2/4 | 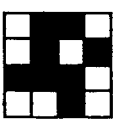 | 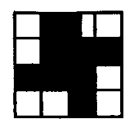 |
| 8+3/4 | 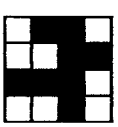 |  |

FIG. 4(a)

| DENSITY | INTERMEDIATE SPOT PATTERN | OUTPUT SPOT PATTERN |
|---|---|---|
| 9 | | |
| 9+1/4 | | |
| 9+2/4 | | |
| 9+3/4 | | |

FIG. 4(b)

| DENSITY | INTERMEDIATE SPOT PATTERN | OUTPUT SPOT PATTERN |
|---|---|---|
| 10 | | |
| 10+1/4 | | |
| 10+2/4 | | |
| 10+3/4 | | |

FIG. 4(c)

| DENSITY | INTERMEDIATE SPOT PATTERN | OUTPUT SPOT PATTERN |
|---|---|---|
| 11 | | |
| 11+1/4 | | |
| 11+2/4 | | |
| 11+3/4 | | |

FIG. 4(d)

| DENSITY | INTERMEDIATE SPOT PATTERN | OUTPUT SPOT PATTERN |
|---|---|---|
| 12 | | |
| 12+1/4 | | |
| 12+2/4 | | |
| 12+3/4 | | |

FIG. 5(a)
| DENSITY | INTERMEDIATE SPOT PATTERN | OUTPUT SPOT PATTERN |
|---|---|---|
| 13 | 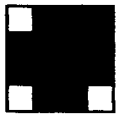 |  |
| 13+1/4 |  | 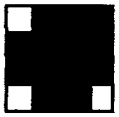 |
| 13+2/4 |  |  |
| 13+3/4 |  |  |
FIG. 5(b)
| DENSITY | INTERMEDIATE SPOT PATTERN | OUTPUT SPOT PATTERN |
|---|---|---|
| 14 |  |  |
| 14+1/4 | 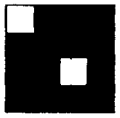 |  |
| 14+2/4 |  |  |
| 14+3/4 |  |  |
FIG. 5(c)
| DENSITY | INTERMEDIATE SPOT PATTERN | OUTPUT SPOT PATTERN |
|---|---|---|
| 15 |  |  |
| 15+1/4 | 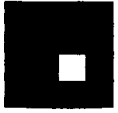 |  |
| 15+2/4 | 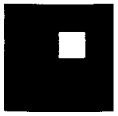 |  |
| 15+3/4 |  |  |
FIG. 5(d)
| DENSITY | INTERMEDIATE SPOT PATTERN | OUTPUT SPOT PATTERN |
|---|---|---|
| 16 |  |  |

INTERMEDIATE SPOT PATTERN
(DEGREE OF DARKNESS = 12)

| 0/16 | 1/5 | 2/9 | 3/13 |
|---|---|---|---|
| 4/12 | 5/1 | 6/2 | 7/6 |
| 8/8 | 9/4 | 10/3 | 11/10 |
| 12/15 | 13/11 | 14/7 | 15/14 |

ATTRIBUTE/ORDER

FIG. 15

| RAW | 1 | 2 | RAW | 13 | 14 |
|---|---|---|---|---|---|
| 4 | 5 | 6 | 7 | RAW | RAW |
| 8 | 9 | 10 | 11 | RAW | RAW |
| RAW | 13 | 14 | RAW | 1 | 2 |
| 7 | RAW | RAW | 4 | 5 | 6 |
| 11 | RAW | RAW | 8 | 9 | 10 |

ATTRIBUTE MATRIX

FIG. 16

| 14 | 5 | 9 | 13 | 11 | 7 |
|---|---|---|---|---|---|
| 12 | 1 | 2 | 6 | 15 | 16 |
| 8 | 4 | 3 | 10 | 18 | 17 |
| 13 | 11 | 7 | 14 | 5 | 9 |
| 6 | 15 | 16 | 12 | 1 | 2 |
| 10 | 18 | 17 | 8 | 4 | 3 |

ORDER MATRIX

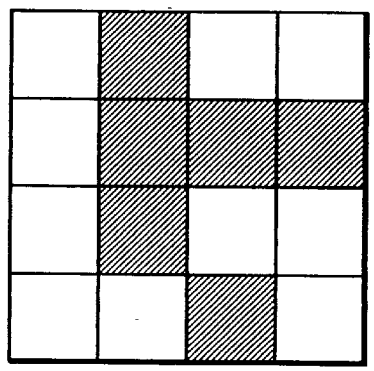

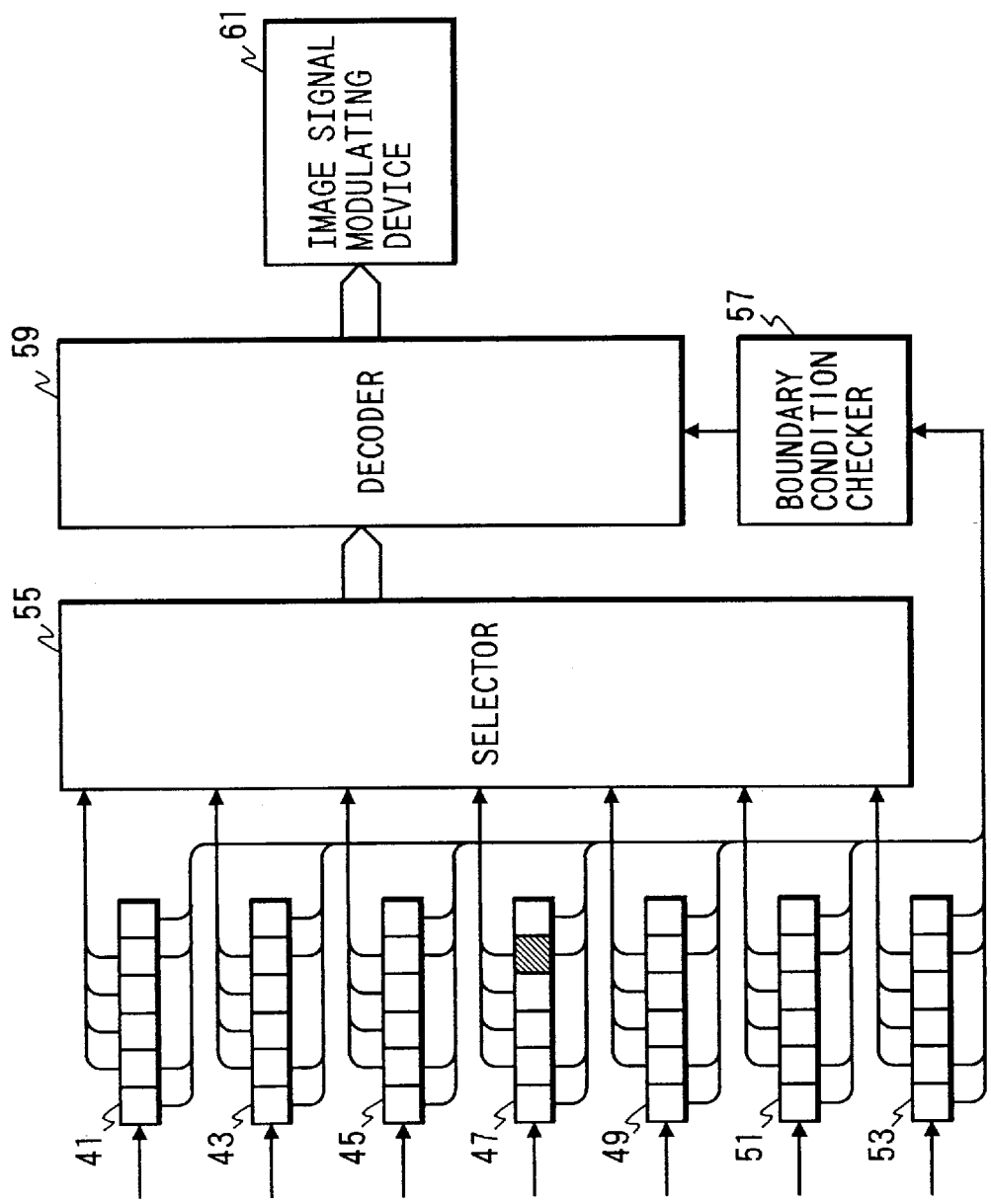

(■:1, □:0, X:IGNORED)

E (■:1, □:0, X:IGNORED)

FIG. 23
| DENSITY | INTERMEDIATE SPOT PATTERN | OUTPUT SPOT PATTERN |
|---|---|---|
| 1 | 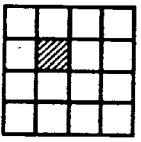 | 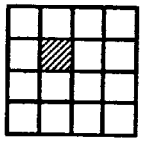 |
| 1+1/4 | 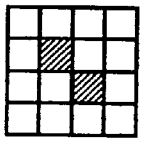 | 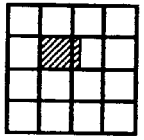 |
| 1+2/4 | 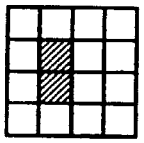 | 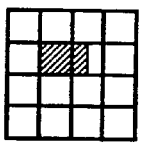 |
| 1+3/4 | 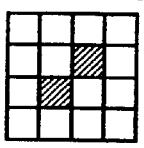 | 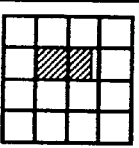 |
| 2 | 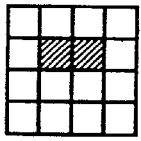 | 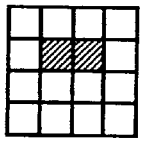 |
| 2+1/4 | 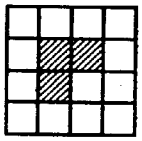 | 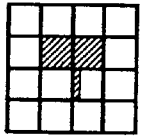 |
| 2+2/4 | 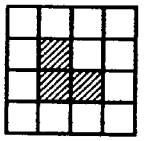 | 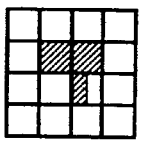 |
| 2+3/4 | 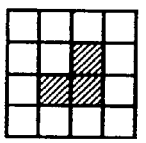 | 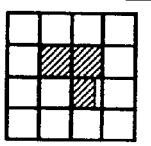 |
| 3 | 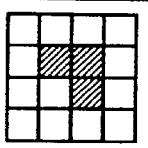 | 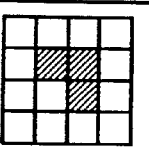 |

FIG. 27
| DENSITY | INTERMEDIATE SPOT PATTERN | OUTPUT SPOT PATTERN |
|---|---|---|
| 1/4 | 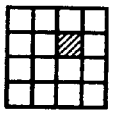 | 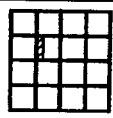 |
| 2/4 | 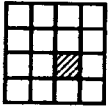 |  |
| 3/4 | 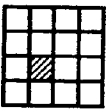 | 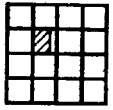 |
| 1 | 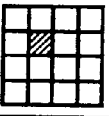 | 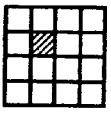 |
| 1+1/4 | 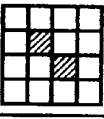 | 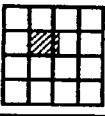 |
| 1+2/4 | 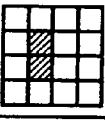 |  |
| 1+3/4 | 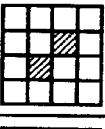 |  |
| 2 |  | 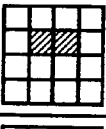 |
| 2+1/4 | 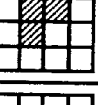 |  |
| 2+2/4 | 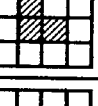 | 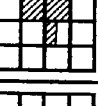 |
| 2+3/4 | 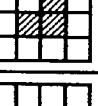 | 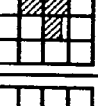 |
| 3 |  |  |

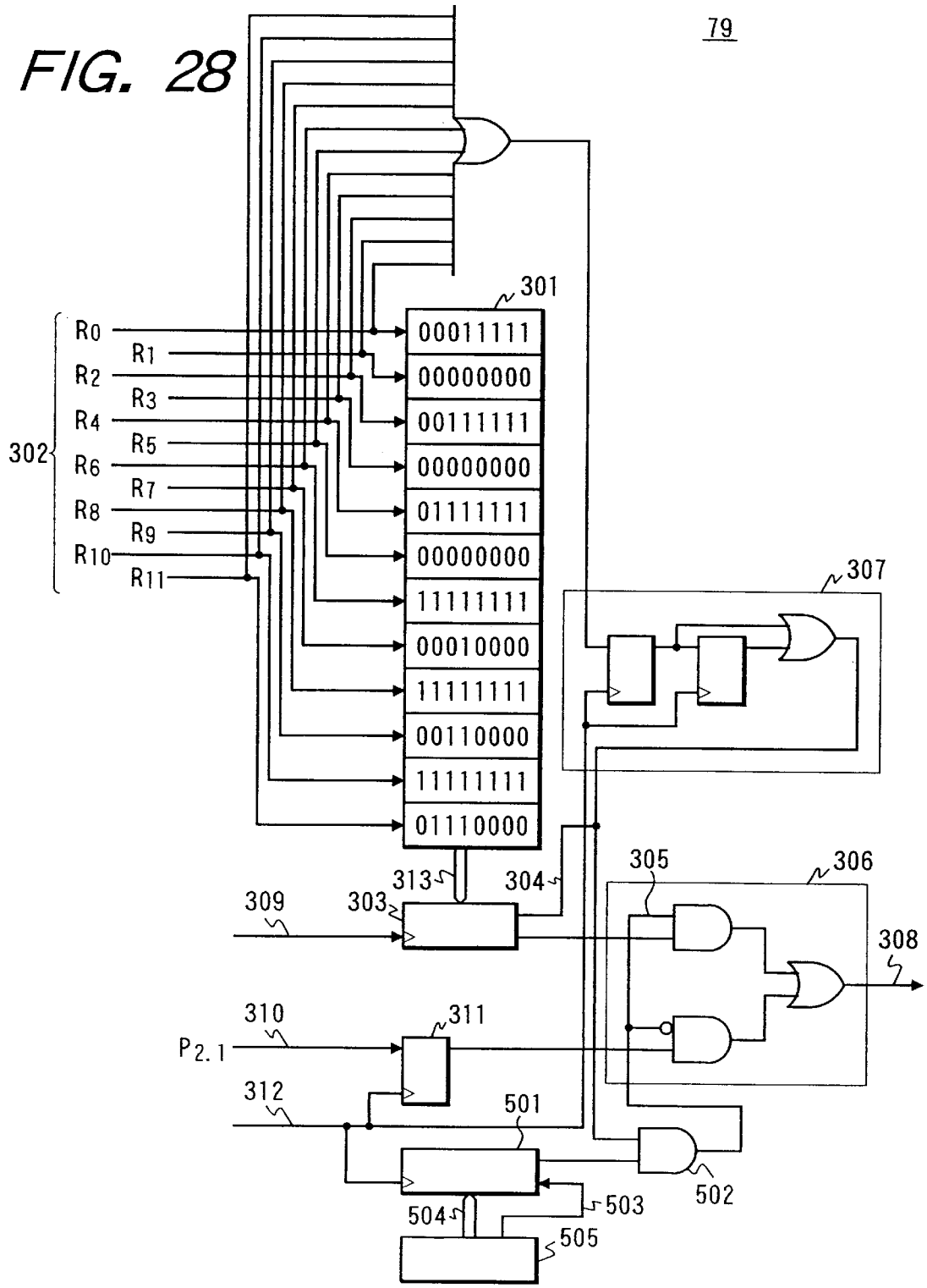

MULTIPLE TONAL RANGE IMAGE PROCESSING SYSTEM

This application is a continuation of application Ser. No. 08/322,346, filed Oct. 13, 1994, now abandoned.

BACKGROUND OF THE INVENTION

1. Field of the Invention

The present invention relates to an image processing system suitable for printing or displaying images in multiple tonal ranges; and more particularly to improvements in techniques for expressing multiple tonal ranges with a minimum amount of data. The present invention is therefore suitable for an image output apparatus, such as a printer or a cathode ray tube display unit, which is capable of displaying luminosity or brightness.

2. Discussion of the Related Art

A dot matrix printer forms an image by printing the pixels of an image in either of the binary color values black and white. When such a dot matrix printer forms a multi-tonal range image, it uses a plural number of pixels as one unit of a tonal range expressing area. This tonal range expressing area is processed using a dither method or a screen method. In such methods, luminosity in multi-tonal ranges results from the number of black pixels in a screen area. In these methods, the number of tonal ranges of luminosity equals the number of pixels forming a tonal range expressing area plus 1.

In recent years, laser printer technology has improved remarkably. Laser printers can produce variations in the density of a single pixel by controlling the energy of a laser beam applied to the pixel. Laser printers using this type of density variation are available and can produce a large number of tonal variations. Laser printers of this type use a pixel information including several bits of tonal range data and control the laser energy by generating a time corresponding to the tonal range data for each pixel by using a digital-to-analog (D/A) converter.

However, these laser printers have a a limit to the number of tonal ranges available. This limit is approximately five for a pixel size of approximately 40 $\mu m^2$.

Using a tonal range expressing area composed of a plural number of pixels according to the dot matrix techniques coupled with the method employed by the laser printer technique an increased number of tonal ranges can be expressed. For example, a tonal range expressing area comprising 16 pixels in a four by four arrangement, the number of tonal ranges which can be expressed will be approximately 65. The amount of data for expressing four tonal ranges is originally allocated to each pixel, however, so that the amount of data necessary for expressing one tonal range is not less than what is expressed by the following equation:

$$(\log_2 5) \times 16 = 37.2 \text{ bits} \tag{1}$$

Accordingly, the amount of the data necessary for expressing one tonal range will be more than six times as much as the amount necessary for expressing 65 tonal ranges in a gray scale image, as indicated by the following equation:

$$\log_2 65 = 6.03 \text{ bits} \tag{2}$$

Furthermore, most images are ordinary documents and drawings which have only the binary values white and black. In these images, the amount of data per 16 pixels for the expression of such a binary value image is expressed by the following equation:

$$(\log_2 2) \times 16 = 16 \text{ bits} \tag{3}$$

This amount is two to three times or less than the amount of data required for one tonal range expressing area as mentioned above.

Therefore, the conventional multi-tonal range image processing system using a tonal range expressing area requires a memory capacity several times greater and an image transfer speed greater than a gray scale image processing system or binary value image processing system, resulting in a more expensive conventional image processing system.

Thus, an image output device which is capable of expressing images in multi-tonal ranges using a minimum of data without requiring any increased memory capacity is needed.

SUMMARY OF THE INVENTION

The present invention has been made in view of the above circumstances and has as an object to offer an image output device which is capable of expressing images in multiple tonal ranges in as small an amount of data requiring any increase in the memory capacity of the image memory.

Additional objects and advantages of the invention will be set forth in part in the description, or may be learned by practice of the invention. The objects and advantages of the invention may be realized and attained by means of the instrumentalities and combination particularly pointed out in the appended claims.

To achieve the objects and in accordance with the purpose of the invention, as embodied and broadly described herein, the multiple tonal range image processing system comprises rasterizing means for generating a raster image in which pixels have one of a plurality of prescribed binary value densities corresponding to a gray level of corresponding pixels in the gray scale image, and half-tone converting means for detecting a spot area, corresponding to one of a plurality of intermediate spot patterns, from the raster image and converting the one of a plurality of intermediate spot patterns detected into a corresponding one of a plurality of output spot patterns, the plurality of intermediate spot patterns being those spot patterns which logically express a prescribed number of multiple tonal ranges with a combination of those pixels which can assume only binary values and also in a varied arrangement of pixels, and the plurality of output spot patterns being spot patterns which actually express the prescribed number of multiple tonal ranges with a combination of pixels which can assume tertiary or more values of a density.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention.

In the drawings,

FIGS. 2(a) through 2(d) illustrate an MGT spot pattern according to a first example of a preferred embodiment of the present invention for densities 1 to 4+¾;

FIGS. 3(a) through 3(d) illustrate an MGT spot pattern according to the first example of a preferred embodiment of the present invention for densities 5 to 8+¾;

FIGS. 4(a) through 4(d) illustrate an MGT spot pattern according to the first example of a preferred embodiment of the present invention for densities 9 to 12+¾;

FIGS. 5(a) through 5(d) illustrate an MGT spot pattern according to the first example of a preferred embodiment of the present invention for densities of 13 to 16;

FIG. 14 is a chart illustrating an attribute and order determined in advance for a MGT spot;

FIG. 15 is a chart illustrating an example of an attribute matrix;

FIG. 16 is a chart illustrating an example of an order matrix;

FIGS. 18(a) through 18(e) illustrate a specific example of a conversion of a gray scale image into a raster image;

FIG. 19 is a block diagram illustrating a hardware construction of a half-tone converting unit in a printer in the first example of a preferred embodiment of the present invention;

FIG. 23 is a chart illustrating an MGT spot pattern to be processed by the laser printer in a second example of preferred embodiment of the present invention;

FIG. 27 is a chart illustrating an MGT spot pattern which is processed according to the modified structure of FIG. 26 of a second example of preferred embodiment of the present invention; and FIG. 28 is a block diagram illustrating a construction of an image signal modulating device in another modified structure of a second example of preferred embodiment of the present invention.

The following reference numbers are used in the figures:
Legends to Reference Marks:
10. Host computer
11. Gray scale input unit
13. Rasterizing means
15. Threshold value matrix and intermediate spot pattern
20. Laser printer
21. Half-tone converting unit
23. Print engine
31. Gray scale image
33. Maximum threshold value matrix
35. Minimum threshold value matrix
37. Intermediate spot pattern
39. Raster image
Drawings
FIG. 1
1. Half-tone cell
d. Screen pitch
θ. Screen angle
3. Screen spot
FIG. 2A
Density
Intermediate spot pattern
Output spot pattern
FIG. 2B
Density
Intermediate spot pattern
Output spot pattern
Density
FIG. 2C
Intermediate spot pattern
Output spot pattern
Density
FIG. 2D
Intermediate spot pattern
Output spot pattern
FIG. 3A
Density
Intermediate spot pattern
Output spot pattern
FIG. 3B
Density
Intermediate spot pattern
Output spot pattern
Density
FIG. 3C
Intermediate spot pattern Output spot pattern
Density
FIG. 3D
Intermediate spot pattern
Output spot pattern
FIG. 4A
Density
Intermediate spot pattern
Output spot pattern
FIG. 4B
Density
Intermediate spot pattern
Output spot pattern
FIG. 4C
Density
intermediate spot pattern
Output spot pattern
FIG. 4D
Density
Intermediate spot pattern
Output spot pattern
FIG. 5A
Density
Intermediate spot pattern
Output spot pattern
FIG. 5B
Density
Intermediate spot pattern
Output spot pattern
FIG. 5C
Density
Intermediate spot pattern
Output spot pattern
FIG. 5D
Density
Intermediate spot pattern
Output spot pattern
FIG. 6
Raster image
n-th line
n+1st line
n+2nd line
n+3rd line
n+4th line
n+5th line
5. Intermediate spot pattern
7. Pattern such as line image
Printer
LED driving pulse
Energy less than one dot
9. Output spot pattern
7. Pattern for line image and the like (Not changed)
FIG. 8
10. Host computer
15. Threshold value matrix and intermediate spot pattern
13. Rasterizing means
11. Gray scale input unit
20. Laser printer 21. Halftone converting unit
23. Print engine
Original gray scale image
Ultimate half-tone image
FIG. 9
31. Gray scale image
13. Rasterizing means
39. Raster image
33. Maximum threshold value matrix
35. Minimum threshold value matrix
37. Intermediate spot pattern
FIG. 10
RASTERIZING
S1. GRAY LEVEL OF PIXEL IS COMPARED WITH MAXIMUM THRESHOLD VALUE
S3. GRAY LEVEL IS LARGER THAN MAXIMUM THRESHOLD VALUE.
S5. THE GRAY LEVEL IS COMPARED WITH MINIMUM THRESHOLD VALUE.
S7. GRAY LEVEL IS SMALLER THAN MINIMUM THRESHOLD VALUE.
S8. IS THE PIXEL AN ELEMENT OF MGT SPOT?
S11. REFERENCE IS MADE TO CORRESPONDING INTERMEDIATE SPOT PATTERN.
S15. THE PIXEL IS EXPRESSED AS BLACK.
S13. IS THE PIXEL BLACK IN THE INTERMEDIATE SPOT PATTERN?
S17. THE PIXEL IS EXPRESSED AS WHITE.
FIG. 11
Intermediate spot pattern (Degree of darkness—12)
FIG. 14
Attribute/Order
FIG. 16
Order matrix
FIG. 17
Density threshold value
Order
FIG. 18
256 tonal ranges
65 tonal ranges
Pattern in 6¼ density
FIG. 19
55. Selector
59. Decoder
57. Boundary condition checker
61. Image signal modulating device
FIG. 20
A
X: Ignored)
B:
X: Ignored)
FIG. 23
Density
Intermediate spot pattern
Output spot pattern
FIG. 27
Density
Intermediate spot pattern
Output spot pattern

DETAILED DESCRIPTION OF THE PREFERRED EMBODIMENTS

Figure 1:
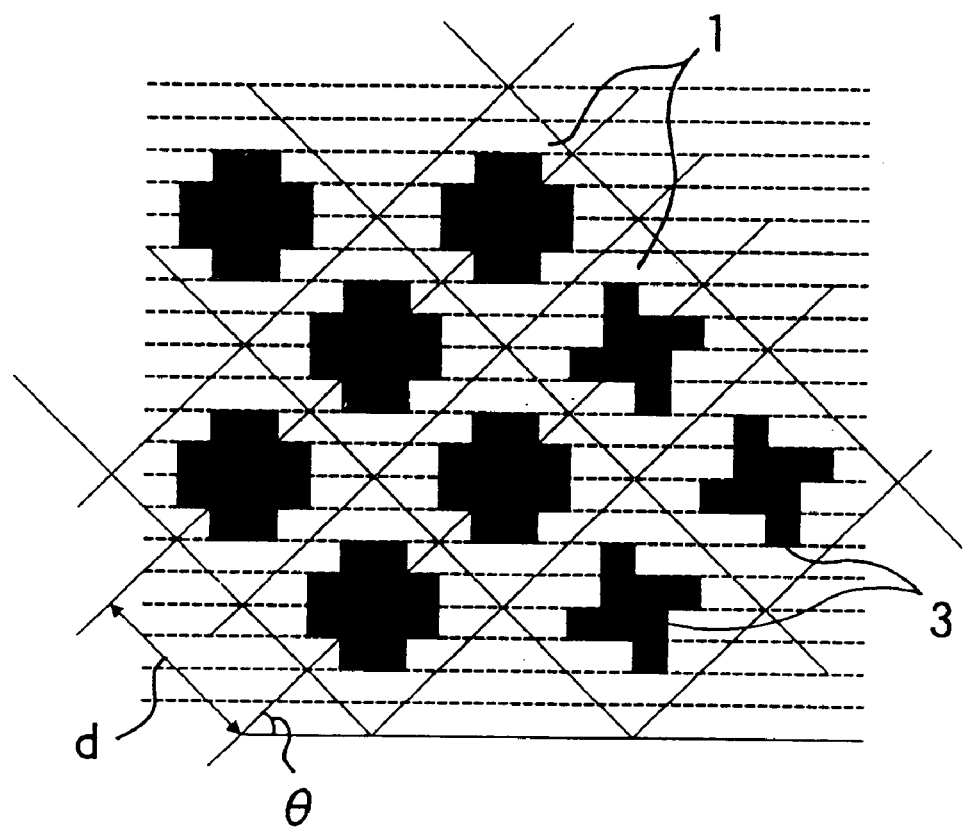
FIG. 1 is an illustration for explaining the terms used in the description of the examples of preferred embodiments of the present invention.

A system according to the first aspect of the present invention is a system for converting a gray scale image into a half-tone image having a spot area composed of a prescribed plural number of pixels for an expression of an image in multiple tonal ranges, wherein the system is a multiple tonal range image processing system provided with the following two elements:

(1) rasterizing means, which generates a raster image in which the corresponding pixels have one of the prescribed binary value densities in accordance with the gray level of the pixels in the gray scale image, and (2) a half-tone converting means, which detects a spot area having one of specified many types of intermediate spot patterns out of the raster images and converts the intermediate spot pattern thus detected into the corresponding one of the specified many types of output spot patterns.

Here, the many types of output spot patterns mentioned above are those spot patterns which have actually expressed the prescribed number of multiple tonal ranges with a combination of those pixels which can assume tertiary or more values of density. What is meant here by the expression, "have actually expressed" is that it can be usually recognized that the actual image printed out or displayed correctly expresses the multiple tonal ranges.

Further, the many types of intermediate spot patterns mentioned above are those spot patterns which have logically expressed a prescribed number of multiple tonal ranges with a combination of those pixels which can assume only binary values and also in a varied arrangement of pixels. Here, the expression, "have logically expressed," means that the spot patterns logically recognize the multiple tonal ranges although they do not necessarily express the multiple tonal ranges in such a manner as to be visually recognizable.

A multiple tonal range image processing system in accordance with a second aspect of the present invention is a system for converting a gray scale image into a raster image having a spot area composed of a prescribed plural number of pixels for multiple tonal range expression, and this system is provided with the following elements:

(1) a dither matrix having the spot area located in a prescribed position;

(2) a plural number of types of spot patterns composed of a combination of those pixels which can take only prescribed binary value densities and which, by a variation of the arrangement of the pixels, logically express a number of tonal ranges larger than the maximum number of the pixels thus combined;

(3) a first rasterizing means which converts the gray level of the pixels located at least in the outside of the spot area in the gray scale image defined above into binary value densities, using the dither matrix; and (4) a second rasterizing means which converts the gray level of at least some of the pixels located in the spot area in the gray scale image into the binary value densities, using the spot pattern defined above.

In the multiple tonal range image processing system according to a first aspect of the present invention, a rasterizing means converts a gray scale image into a raster image composed of pixels having binary value densities. The raster image includes information indicating an intermediate tonal range embedded in an arrangement of pixels forming a prescribed intermediate spot pattern. Therefore, this raster image "logically" expresses a larger number tonal ranges, using pixels in binary value densities, than the number of tonal ranges that can be actually expressed. A half-tone converting means converts this raster image into a half-tone image which "actually" expresses the multiple tonal ranges, using pixels in density not less than a tertiary value.

When this system is applied, for example, to a printing system comprising a host computer and a laser printer, it is possible to provide the host computer with a rasterizing means and to provide the laser printer with a half-tone converting means, which executes immediately before a print-out operation. With this construction, images which are to be stored and processed within the printer are raster images and it is possible to utilize an apparatus having a memory capacity and a processing speed corresponding to an amount of data smaller than a large number of tonal ranges which can be expressed ultimately.

In the multiple tonal range image processing system according to a second aspect of the present invention, a first rasterizing means converts the gray level of those pixels which are located at least in the outside of the spot area in the gray scale image into binary value densities, using a dither matrix prepared in advance. Further, a second rasterizing means converts the gray level at least in some of the pixels located in the spot area in the gray scale image into binary value densities, using an intermediate spot pattern prepared in advance.

Line charts and contours of graphic figures contained in original gray scale images are converted into patterns of pixels of binary value densities in accordance with the pattern shapes. Furthermore, half-tone areas in which intermediate gray levels are in a two dimensional-distribution of continuous variation are converted into a distribution of intermediate spot patterns logically expressing multiple tonal ranges. Moreoever, the intermediate spot patterns are isolated from one another to the maximum extent possible in the converted raster image so that these patterns are distinguished spatially and also logically from those patterns which express line images or the like.

Such a raster image favorably and logically expressed both the multiple tonal range patterns and the binary value patterns such as line images in a half-tone area, and such a raster image has the same amount of data as an image expressing only patterns in binary values. This amount of data is smaller than an amount of data in an image expressing multiple ranges by the prior art processes. By storing this raster image and processing it, for example, in a printer, and detecting only intermediate spot patterns immediately before a print-out operation and converting them into spot patterns actually expressing multiple tonal ranges, makes it possible to produce print-out high-quality images which favorably express half-tone images in multiple tonal ranges as well as binary value patterns for line images and the like.

In an example of a preferred embodiment of the present invention, a plural number of types of dither matrixes are prepared in advance to correspond to a plural number of types of arrangements of different spot area densities in a raster image. Each of the dither matrices is set up in accordance with a condition that limits the usable types of the intermediate spot patterns to those which belong to a prescribed set of small density ranges so that the intermediate spot patterns may be isolated on the raster image in an arrangement of the corresponding spot areas. The system is constructed in such a manner that one of the plural number of types of dither matrices may be used selectively for converting a gray scale image into a raster image.

When a dither matrix having a high density in the spot area has been selected, the range of densities in which multiple tonal range expressions can be attained is decreased, and yet the resolution in the half-tone area in which a multiple tonal range expression is produced will be enhanced. When a dither matrix having a low density has been selected, the range of densities in which multiple tonal range expressions can be attained will be increased, but the resolution in the area in which a multiple tonal range expression is produced is reduced. Thus, this system allows a selection of an appropriate dither matrix in a manner suitable for each particular case.

Some terms used in the following description will be explained with reference to FIG. 1. The term, "gray scale image," means an image which has many intermediate tonal range values between the white level and the black level for every pixel (dot). The term, "raster image," means an image which has a fixed tonal range value of either the white level or the black level in each pixel. The term, "half-tone image," means a type of raster image composed of half-tone cells. The term, "half-tone cell," means an area 1, as shown in FIG. 1, composed of a plural number of dots expressing an intermediate tonal range by the number of black dots. The term, "screen spot," means a lump 3, as shown in FIG. 1, of black dots in a half-tone cell 1. The term, "spot pattern," means a shape of a screen spot 3. The term, "screen pitch," means an interval d for the arrangement of half-tone cells, as shown in FIG. 1. The term, "screen angle" means the angle θ which the angle of the direction of screen spots forms with the horizontal direction of the paper surface.

The term, "MGT," is an abbreviation of the expression, "Micro Gray Technology," which is used as the designation of the image processing system according to the present invention as described in this Specification.

Figure 8:
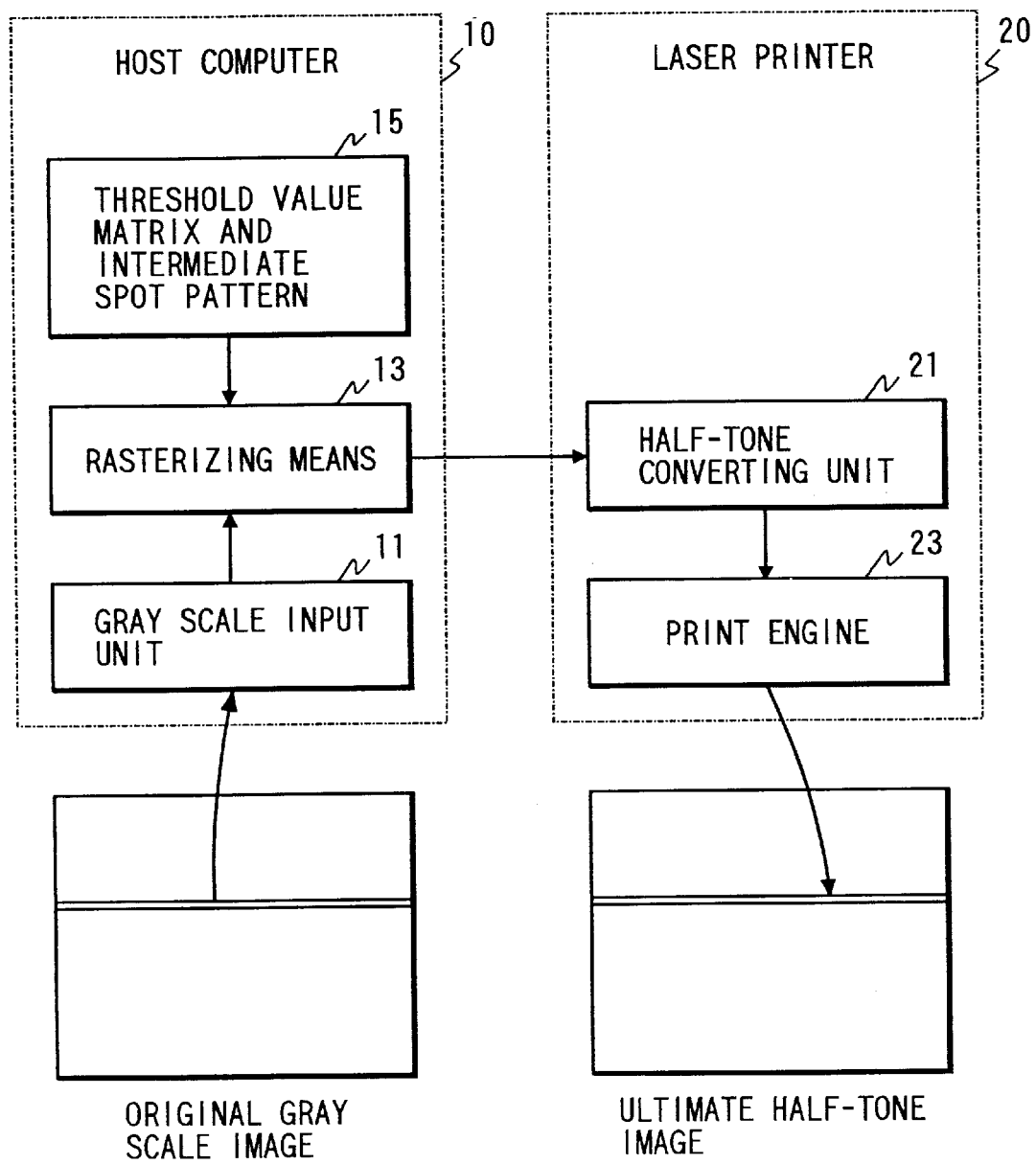
FIG. 8 is a block diagram illustrating a structure of the functions of an entire system in the first example of a preferred embodiment of the present invention.

In a preferred embodiment of the invention, the entire system comprises host computer 10 and laser printer 20, connected to host computer 10, as shown in FIG. 8 (and described in detail later). Host computer 10 inputs a gray scale image, converts it into a raster image, and transfers the raster image to laser printer 20. Laser printer 20 converts the raster image from host computer 10 into a half-tone image which properly expresses the tonal ranges and prints out the resultant half-tone image.

FIGS. 2(a) through 5(d) show various spot patterns determined in advance for use in obtaining an ultimate half-tone image from an original-gray scale image in this system.

To express 61 tonal ranges in density intervals of ¼ in density from 1 to 16, two types of spot patterns are used. These are referred to as "an intermediate spot pattern" and "an output spot pattern" and are set up for each of the tonal ranges. These spot patterns are set up as a pattern consisting of black pixels in an area of four pixels by four pixels for a total of sixteen pixels. In subsequent parts of this Specification, the area composed of four pixels by four pixels in which each of these spot patterns is set up is called an "MGT spot."

An "intermediate spot pattern" is a spot pattern used for expressing the multiple tonal ranges in a gray scale image when host computer 10 converts an entered gray scale-image into a raster image, as will be described in detail later. This intermediate spot pattern, which allocates a black level or a white level to each of the sixteen pixels in an MGT spot pattern, has a total of sixteen bits in the amount of its data. The number of tonal ranges which can be expressed by the number of black pixels is essentially sixteen tonal ranges. However, this intermediate spot pattern "logically" expresses a number of tonal ranges four times as many as the above-mentioned number of the essential tonal ranges with tonal range data embedded in an arrangement of black pixels in this intermediate spot pattern.

An "output spot pattern" is a spot pattern for converting an intermediate spot pattern in a raster image when the printer prints out a raster image from host computer 10, as described later. In other words, this output spot pattern has tonal range data embedded in an arrangement of black pixels of an intermediate spot pattern, the tonal range data being made kinetic as the number of pieces of black areas at intervals of ¼ of a pixel, and the side of the black area faithfully expresses the density.

For example, the four tonal ranges from the density 1 to the density 2 by ¼ densities is shown in FIG. 2(a). The number of black pixels is two in the intermediate spot pattern, but the arrangement of the black pixels is different for each tonal range embedded in this arrangement. The corresponding output spot pattern has the embedded tonal range made kinetic by the black area for ¼ pixel to one pixel. The size of the black area faithfully expresses the density from 1 to 2 in ¼ pixel increments.

Thus, the utilization of an intermediate spot pattern with tonal range data embedded in the black pixel arrangement greatly reduces the amount of data in the raster image to be processed by a printer in comparison to the ultimate half-tone image which uses an output spot pattern.

Moreover, the difference between the intermediate spot pattern and the output spot pattern is set in such a manner that the difference will be within three pixels in terms of the difference in pattern and within one pixel in terms of the difference in density. Because of this, side effects are very small when the diameter of one dot is as small as 40 $\mu m^2$, even if a conversion has been erroneously made of a part which was not intended for conversion.

Figure 6:
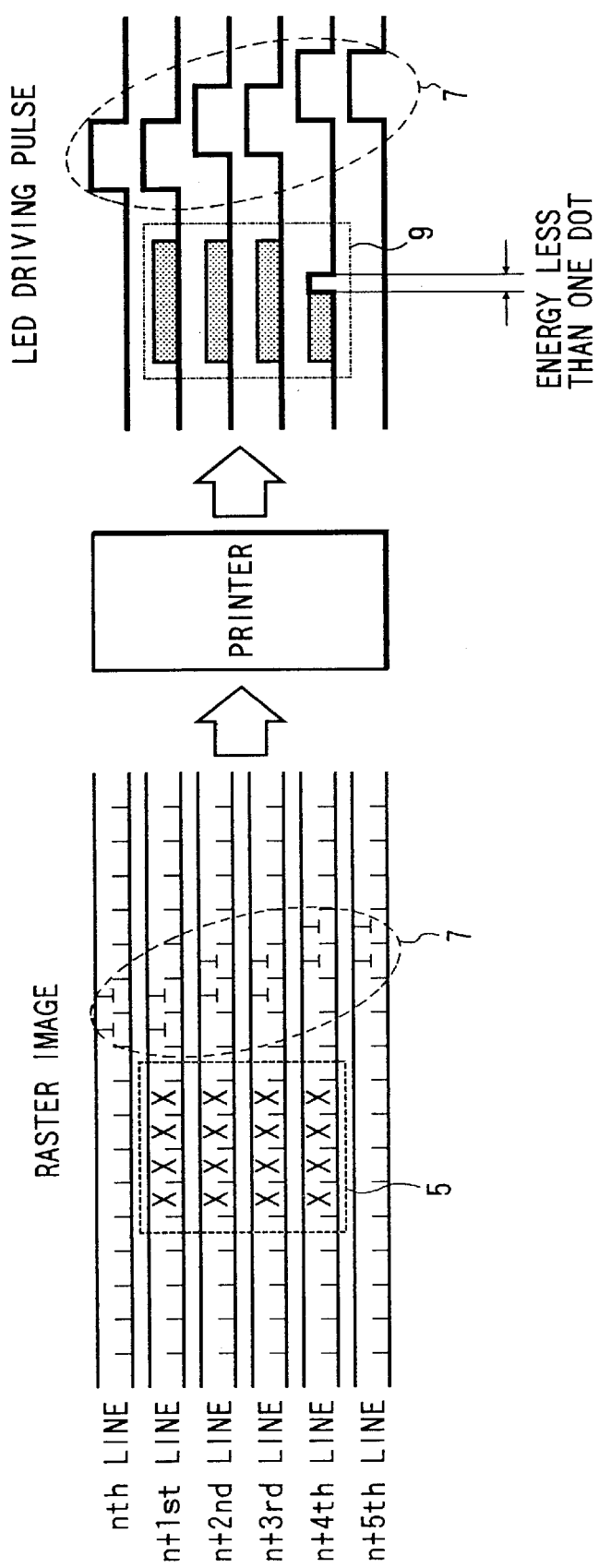
FIG. 6 is a chart illustrating an outline of an image processing operation performed by a printer in the first example of a preferred embodiment of the present invention.

FIG. 6 shows an outline of the image processing operation which the printer will perform in this system.

The printer receives an input of a raster image as shown on the left side of FIG. 6. In some cases, such a raster image includes both a half tone portion, such as a photograph, and a portion in black and white levels, such-as line images. In such a case, the half-tone is expressed by an intermediate spot pattern 5, as mentioned above, and the black and white levels are expressed by the ordinary line image pattern 7.

When a raster image like this is entered into a printer (for example, a laser printer), the printer detects intermediate pattern 5 out of the raster image thus entered and converts intermediate pattern 5 into a corresponding output pattern 9 while retaining the pattern 7 for line images and the like as it is. The printer then applies this output spot pattern 9, together with the pattern 7, as driving pulses to a light emitting diode, which is used as an image drawing laser unit. As the result of these operations, the half-tone image printed out can express such half-tone images as a photograph in a natural rendition in multiple tonal ranges while the line images and the like are expressed distinctly at black and white levels.

Now, in the processing of images by a printer as shown in FIG. 6, it is necessary to distinguish between intermediate spot pattern 5 and pattern 7 for line images and the like in the input raster image. One of the indicators which can be utilized for making such a distinction is the difference between whether patterns composed of black pixels are isolated for the individual half-tone cells or connected over any plural number of half-tone cells. That is, a spot pattern expressing a pale half-tone should generally be isolated for the individual half-tone cells as shown in FIG. 1. On the other hand, a dark black pixel pattern forming a line image or the like should be connected from the starting point of a line to the end point. Therefore, as described in detail later, the printer determines whether the black pixel patterns detected from the input raster image are isolated or connected.

To make the above-mentioned distinction possible, the host computer must set up the intermediate spot patterns to be isolated from one another as much as possible on the raster image when converting the gray scale image into a raster image. To attain this setup, certain restrictions on the arrangement of the MGT spot pattern on the image and the type of the usable spot pattern are imposed. FIGS. 7(a) through 7(g) show variations in the arrangement of the MGT spot (the area enclosed in the thick solid line) which is to be employed for this system.

Figure 7A:
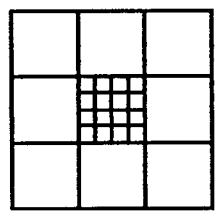
FIGS. 7(a) through 7(g) illustrate variations of the arrangement which the MGT spot pattern may assume in the first example of a preferred embodiment of the present invention.
Figure 7B:
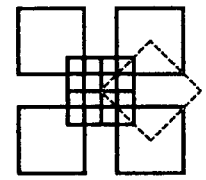
Figure 7C:
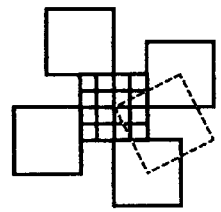
Figure 7D:
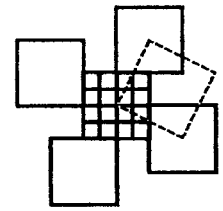
Figure 7E:
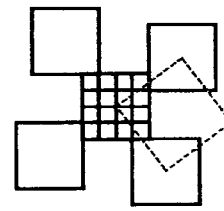
Figure 7F:
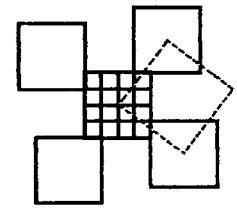
Figure 7G:
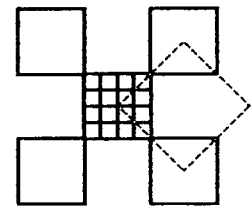

FIG. 7(a) shows the most dense MGT spot arrangement and FIG. 7(g) shows the most sparse arrangement. FIGS. 7(b) to 7(f) show intermediate density arrangements in. The rectangular shape indicated in a broken line in these Figs. shows the size and inclination (screen angle) of the half-tone cell at the level of each spot.

To ensure that the spot patterns in the MGT spot are isolated, the most dense arrangement shown in FIG. 7(a) does not allow the use of the patterns other than those in the 29 tonal ranges from the density 1 to the density 8 shown in FIGS. 2(a)–(d) and 3(a)–(d). For any density darker than 8, this arrangement cannot isolate intermediate spot patterns from one another so the tonal ranges which can be expressed will be eight tonal ranges separated and scattered in the range from the density 9 to the density 16.

With the arrangements shown in FIGS. 7(b), 7(c), and 7(d), the patterns n the 45 tonal ranges from the density 1 to the density 12 shown in FIGS. 2(a) through 4(d) can be used. With the arrangements shown in FIGS. 7(e) and 7(f), the patterns in the 53 tonal ranges from the density 1 to the density 14 shown in FIGS. 2(a) through 5(b) can be used. Furthermore, with the most sparse arrangement shown in FIG. 7(g) all 61 patterns in the 53 tonal ranges from the density 1 to the density 14 can be used.

In this manner, as the density of the arrangement of the MGT spots increases, the types of the usable spot patterns will decrease to a smaller range. That is, the range of tones in which fine multiple tonal range expression can be attained will be limited to a range of pale tones. On the contrary, the more sparse the arrangement of the MGT spots is, the more the types of the usable spots patterns will be extended to a range of larger density. That is, the range of tones in which fine multiple tonal range expression can be attained will be extended to the range of darker-tones. Moreover, since a multiple tonal range expression is more influenced by pale tones than dark tones, the influence will be small, even if the range in which a multiple tonal range expression can be produced is limited to a range of pale tones.

On the other hand, the more dense the arrangement of spots is, the smaller the size of the half-tone cells will be. Specifically, the screen pitch will be narrower, and the resolution will be higher. On the contrary, the more coarse the arrangement of spots is, the larger the size of the half-tone cell will be. Specifically, the screen pitch will be wider, and the resolution will be lower.

Thus, the density in the arrangement of spots produces changes in the capability for a tonal range expression and changes in the resolution in inverse relationship. Therefore, it is desirable to determine which of the arrangements of spots is to be employed on a case-by-case basis in such a manner that the selected arrangement of spots is suitable for the picture quality of the original gray scale image and the picture quality or the like of the desired print.

Next, the details of this system will be described with reference to FIGS. 8(a) through 20(b).

FIGS. 8(a)–(e) illustrate the overall construction of the functions of this system.

The host computer 10 has gray scale input unit 11, which receives the gray scale image data one line after another as entered from an image scanner or the like, and rasterizing unit 13, which converts the entered gray scale image into raster data. Rasterizing unit 13 converts the half-tone portion of the gray scale image into a half-tone image using an intermediate spot pattern, as described above. Rasterizing unit 13 utilizes two kinds of threshold value matrices (to be described in detail later), which are stored in main memory device 15, and the intermediate spot patterns shown in FIGS. 2(a) through 5(d).

The laser printer 20 has half-tone converting unit 21, which receives a raster image from host computer 10 and converts the raster image into a half-tone image, and print engine 23, which prints out the half-tone image. Half-tone converting unit 21 converts an intermediate spot pattern contained in the raster image fed from host computer 10 into an output spot pattern, as already described above.

Now, the processing operations performed by rasterizing unit 13 of host computer 10 will be described in detail below with reference to FIGS. 9 through 18(e).

Figure 9:
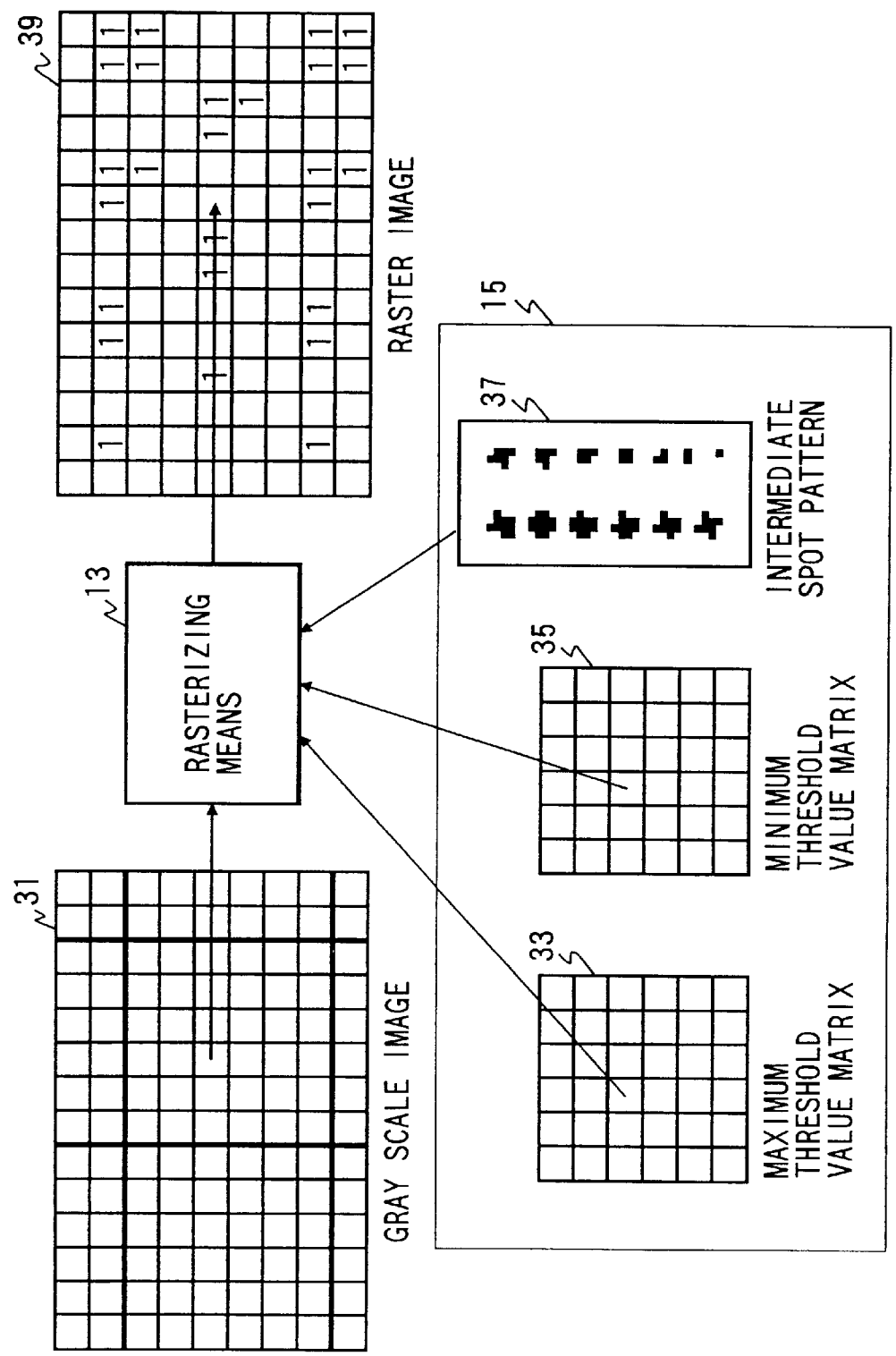
FIG. 9 is a block diagram illustrating processing operations performed by a rasterizing unit in a host computer in the first example of a preferred embodiment of the present invention.

As shown in FIG. 9, rasterizing unit 13 applies maximum threshold value matrix 33, minimum threshold value matrix 35, or intermediate spot pattern 37 to entered gray scale image 31, thereby converting the gray scale image 31 into raster image 39. Here, the maximum threshold value matrix 33 is a converting matrix containing a statement of the density threshold value for specifying black for the individual pixels of the gray scale image 31. Moreover, the minimum threshold value matrix 35 is a converting matrix which contain a statement of a density threshold value for specifying white for the individual pixels of gray scale image 31.

The sizes of maximum threshold value matrix 33 and minimum threshold value matrix 35 will be determined by the arrangement of the MGT spot shown in FIGS. 7(a)–(g). Specifically, the sizes of maximum threshold value matrix 33, and a minimum threshold value matrix 35 will be determined in such a manner that the spot pattern, in accordance with the arrangement of spots shown in FIGS. 7(a)–(g), will be automatically obtained by the application of maximum threshold value matrix 33 and minimum threshold value matrix 35 to each of the individual areas demarcated by the thick solid line in gray scale image 31 as shown in FIG. 9. Specifically, their sizes are four pixels by four pixels in the arrangement shown in FIG. 7(a), six pixels by six pixels in the arrangement shown in FIG. 7(b), ten pixels by ten pixels in the arrangements shown in FIGS. 7(c) and 7(d), 25 pixels by 25 pixel in the arrangement shown in FIGS. 7(e) and 7(f), and either pixels by eight pixels in the arrangement shown in FIG. 7(g).

Figure 10:
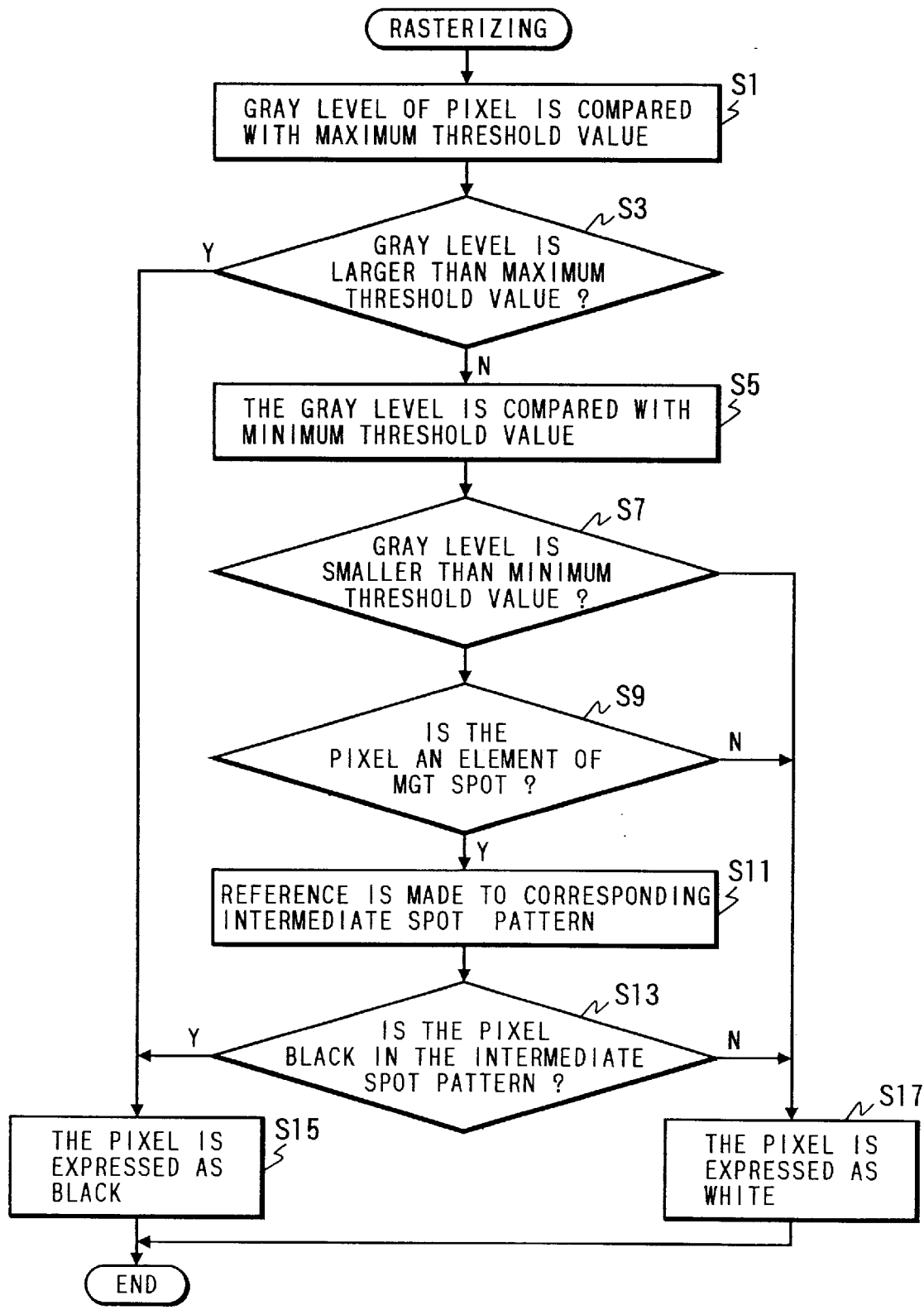
FIG. 10 is a flow chart illustrating processing operations performed by the rasterizing unit.

FIG. 10 illustrates the flow of the processing operations performed by rasterizing unit 13.

First, the gray level (density) of gray scale image 31 is compared with the maximum threshold value of the corresponding pixels in maximum threshold value matrix 33 (S1). If the result of the comparison reveals that the gray level is larger than a maximum threshold value (S3), then the pixels are specified as being black (S15). When the gray level is equal to or any less than the maximum threshold value, the gray level is then compared with the minimum threshold value of the corresponding pixels in the minimum threshold value matrix 35 (S5). If the result of this comparison reveals that the gray level is smaller than a minimum threshold value (S7), the pixel are specified as being white (S17).

When the gray level is not larger than the maximum threshold value and not smaller than the minimum threshold value, then it is determined whether or not the pixels are any element of the MGT spot (S9). If this operation results in the finding that particular pixels are not any element of the MGT spot then the pixels are specified as being white (S17). When the pixels are the elements of the MGT spots then reference is to be made to the intermediate spot pattern corresponding to the density of the MGT spot (S13), and it is decided whether the particular pixel is to be specified as black or as white in accordance with that intermediate spot pattern (S13, S15, and S17).

Now, a detailed description will be made with respect to steps S9 through S13.

Figure 11:
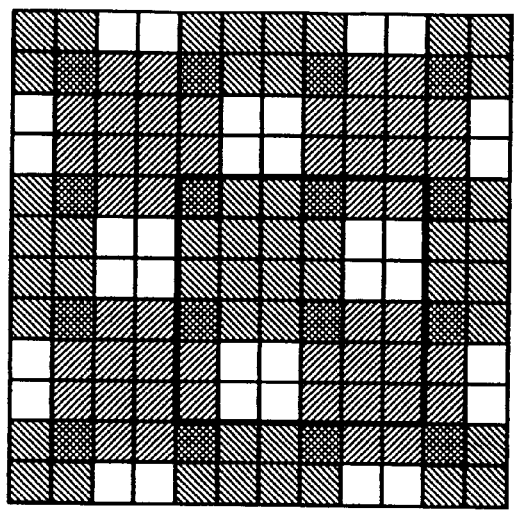
FIG. 11 is a chart illustrating an example of a positional relationship between a threshold matrix and the MGT spot to which the rasterizing unit refers.
Figure 12:
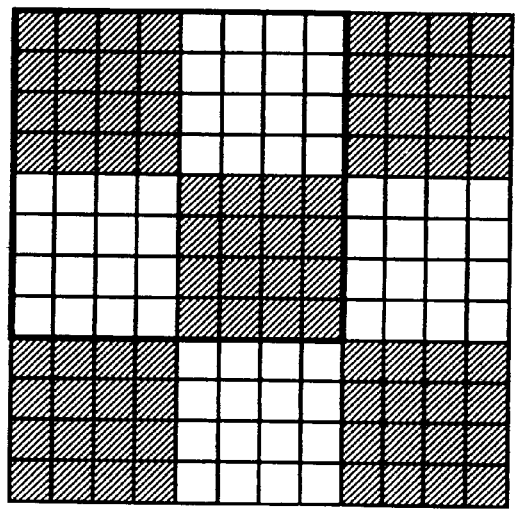
FIG. 12 is a chart illustrating another example of a positional relationship between the threshold matrix and the MGT spot to which the rasterizing unit refers.

FIGS. 11 and 12 show the positional relationship between the MGT spot and the threshold value matrix. The rectangular area indicated by hatching is each MGT spot and the rectangular area enclosed with the thick solid line is a threshold value matrix. FIG. 11 shows the positional relation to the spot arrangement shown in FIG. 7(*b*), and FIG. 12 shows the positional relation in the spot arrangement shown in FIG. 7(*g*).

A judgment whether or not the pixels at step S9 are any element of the MGT spot is to be made on the basis of the position of the MGT spot in the threshold value matrix as shown in FIGS. 11 and 12. Specifically, if any pixel in the threshold value matrix corresponding to a particular pixel is contained in the MGT spot, it is judged as an element of the MGT spot.

FIG. 13 through FIG. 17 show how the maximum threshold value matrix and the minimum threshold value matrices are determined with examples taken from the spot arrangement shown in FIG. 7(*b*).

Figure 13:
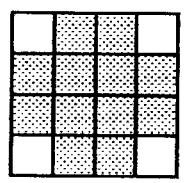
FIG. 13 is a chart illustrating an intermediate spot pattern in the maximum density usable in the arrangement shown in FIG. 7(a)

First, as shown in FIG. 13, the pattern with the maximum density is selected out of the intermediate spot patterns which can be used for the spot arrangement used. In the case of the spot arrangement shown in FIG. 7(*b*), the intermediate spot pattern in the density 12 shown in FIG. 4(*d*) is selected.

Also, as shown in FIG. 14, an attribute and an order are assigned in advance to each of MGT spot. Here, the term, "attribute," means an identification number for each pixel given to each pixel in a sequential order starting with the pixel in the upper left end as shown in the Fig. Also, the term "order," means the sequential order in which the spot is filled with black pixels. The order is set in such a manner that black pixels are arranged to start with the pixel (for example, the pixel with the attribute 5) which is in the position closest to the center in the spot and along a spiral route and uniformly in the upper, lower, leftward, and rightward directions. By filling the black pixels in accordance with this order, a pot pattern in a turbine shape as shown in FIGS. 2(*a*) through 5(*d*) will be obtained.

Next, the attribute/order shown in FIG. 14 for the black pixels for the intermediate spot pattern in the maximum density shown in FIG. 13 are set in the position of the MGT spot in the threshold matrix shown in FIG. 11. By this operation, the attribute matrix shown in FIG. 15 and the order matrix shown in FIG. 16 are obtained. In the attribute matrix shown in FIG. 15, a particular number indicating the attribute is assigned only to the pixel corresponding to the intermediate spot pattern with the maximum density, and no particular number is assigned to any other pixels ("RAW") in the matrix. In the order matrix shown in FIG. 16, the prescribed order shown in FIG. 14 is assigned to the pixel corresponding to the intermediate spot pattern in the maximum density, and a larger number expressive of the order is assigned to each of the other pixels by an appropriate method (for example, in an arbitrary manner determined at the user's discretion).

Figure 17:
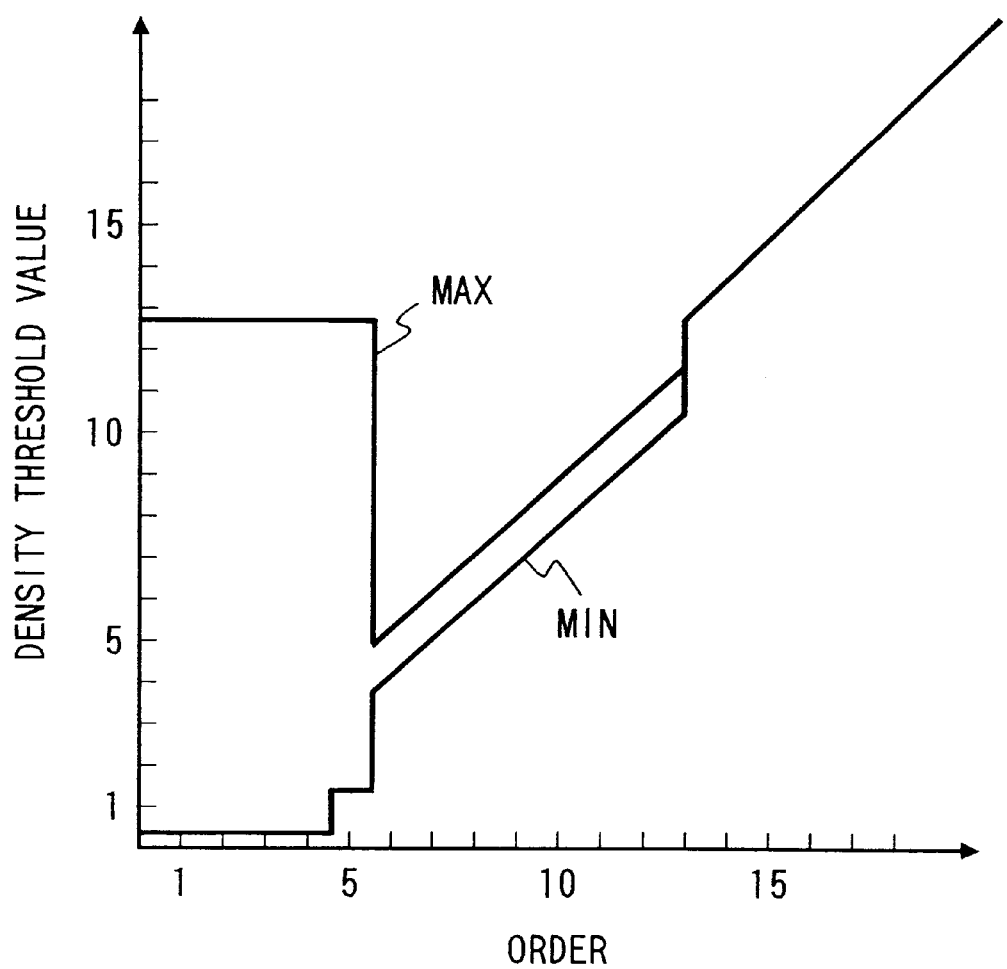
FIG. 17 is a chart illustrating an example of the relationship between an order, a maximum threshold value, and the minimum threshold value.

Next, by applying, for example, a relation shown in FIG. 17 to the order matrix shown in FIG. 16, the maximum threshold value MAX and the minimum threshold value MIN for each of the pixels in the matrix are determined. By this operation, the maximum threshold value matrix 33 and the minimum threshold value matrix 35 are obtained.

The following results will be obtained by performing the processing operations shown in FIG. 10, using the maximum threshold value 33 and the minimum threshold value 35, which are obtained in the manner described above.

Those parts, such as line images, which are composed of black levels and white levels only in the original gray scale image are converted into a raster image which faithfully expresses the black and white levels of line images and the like since the black level is always larger than the maximum threshold value MAX shown in FIG. 17 and the white level is always smaller than the minimum threshold value MIN shown in FIG. 17.

On the other hand, those parts which are in half-tone in the original gray scale image are converted into raster images in the manner described below.

When the gray level (density) of a half-tone portion is in excess of the maximum density (the density 12 in the case of this example) in the intermediate spot pattern which can be used, all the pixels in the intermediate spot pattern in the maximum density will be back, and those pixels in the outside of the intermediate spot pattern will be white or black in accordance with their respective gray levels. That is, all the pixels in order numbers 1 through 12 will be black while the pixels in order numbers 13 and larger will be white or black in accordance with their respective gray levels.

Moreover, in case the gray level (density) of a half-tone portion is not in any excess of the maximum density (the density 12) of the usable intermediate spot pattern, only the pixels in the inside of the particular intermediate spot pattern in the maximum density will be white or black in accordance with their respective gray levels, and those pixels in the outside of the particular intermediate spot pattern will surely be white. That is, only the pixels of order number 1 through 12 in the order matrix shown in FIG. 16 will be white or black in accordance with their respective gray levels, but those pixels in the order numbers 13 and larger will surely be white. This means that black pixels are formed only in the MGT spot (i.e., the screen spot).

When a screen spot is formed only in an MGT spot, the spot pattern is determined as follows. Specifically, when the gray level of a pixel is larger than the maximum threshold value MAX or smaller than the minimum threshold value MIN, the particular pixel is specified as black or white, as already described with reference to FIG. 10 (S15 and S17 in FIG. 10). On the other hand, when the gray level of a pixel is between the maximum threshold value MAX and the minimum threshold value MIN then reference will be made to an intermediate spot pattern in accordance with the representative gray level the MGT spot (S11) and the pixel will be specified as white or black in accordance with the particular intermediate spot pattern (S13, S15, and S17).

The conversion made in the MGT spot in the latter case will be specifically described with reference to FIG. 18.

FIG. 18 is an original scale image indicated in the tonal range values for 256 tonal ranges. In general, the amount of change in the tonal range values between adjacent pixels in a half-tone portion is 1 or less, as shown in FIG. 18(a). The tonal range values for this original gray scale image are converted into gray levels on a scale corresponding to the densities (in a total of 65 tonal ranges from density 0 to density 16) which are used for the intermediate spot patterns shown in FIGS. 2 through 5, as shown in FIG. 18(b).

When the maximum threshold value and the minimum threshold value shown in FIG. 17 are applied to the gray scale image shown in FIG. 18(b), those pixels which are positioned in the vicinity of the outer circumference, where the pixels are late in their order, can be set in white or black, but those pixels which are positioned in an area in the proximity of the center, where the pixels are early in their order, cannot be set in either white or blacks as it is indicated by "?" in FIG. 18(c). Therefore, the representative gray level for this MGT spot is then determined. For example, the gray level 6+¼ of the pixel P5 with the attribute number 5 in the MGT spot is taken as the representative gray level.

Next, reference is made to the intermediate spot pattern which corresponds to this representative gray level 6+¼. This is a spot pattern as shown in FIG. 18(d). According to the spot pattern in FIG. 18(d), either white or black is to be decided for each of the pixels marked "?". As the result of this operation, a raster image as shown in FIG. 18(e) can be obtained.

By the processing operations described above, a gray scale image is converted into a raster image. This conversion has the characteristics described below.

(1) A half-tone portion in a gray scale image having any gray level below the maximum density in a usable intermediate spot pattern will be converted into a half-tone image in multiple tonal ranges using an intermediate spot pattern so long as it does not contain any abrupt change in the gray level (for example, an edge or the like of a figure).

(2) A half-tone portion having any gray level in excess of the maximum density of a usable intermediate spot pattern is converted into a raster image by a technique similar to the rasterizing operation in practice according to the prior art.

(3) An abrupt change which occurs in the gray level on the edge or the like of a graphic figure in a half-tone portion is faithfully expressed by a change which occurs in the number of black pixels in accordance with such a change.

(4) Line images and the like are faithfully expressed in two tonal ranges (i.e., black and white).

Next, with reference to FIGS. 19 through 20(b), a detailed description will be made of half-tone converting unit 21 in laser printer 20 shown in FIG. 6.

FIG. 19 illustrates the hardware construction of half-tone converting unit 21.

The data in the same horizontal positions on seven consecutive lines in a raster image received from host computer 10 are put into seven units of six-stage shift registers 41 through 53. The data are synchronized with a prescribed shift clock and then shifted to the rear stages of shift registers 41 through 53. Here, the data present on the fifth stage (the stage indicated by hatching) out of the fourth line, i.e., the line put into the shift register 47 are the data which are to be taken as the object of the current converting process, and the data will be referred to as "the object data" in the following part.

Selector 55 takes the data from four stages, second stage to the sixth stage, of each of the seven units of shift registers 41 through 53 and selects and transfers a set of data for four consecutive lines out of the input data (i.e., data composed of four pixels by four pixels forming the same size as that of the MGT spot) to decoder 59. In this case, the selector 55 shifts the above-mentioned four lines one line after another as selected out of the above-mentioned seven lines. That is, the selector 55 transfers a set of data on the uppermost four lines from the shift registers 41 to 47, a set of data for the second four lines as counted from the uppermost line from shift registers 43 to 49, a set of data for the third four lines as counted from the uppermost line from the shift registers 45 to 51, and a set of data for the lowermost four lines from the shift registers 47 to 53 to a decoder 59 synchronized to the select clock mentioned above.

A boundary condition checker 57 takes up the data at the first stage, the second stage, the sixth stage and the seventh stage of the seven units of the shift registers 41 through 53 as input into it and checks the boundary conditions for a detection of the intermediate spot pattern as already described above. The check of the boundary condition is a check by an AND operation to determine whether or not the black pixels in the four pixels by four pixels which are transferred to decoder 59 are connected with the black pixels on the outer circumference of this area. For example, in a case as shown in FIG. 20(a), the black pixels in the area are not connected with the black pixels on the outer circumference but are isolated from them, and accordingly the black pixels in this area are detected as an intermediate spot pattern. On the other hand, in a case as shown in FIG. 20(b), the black pixels in the area are connected with the black pixels on the outer circumference indicated by the mark E, so that the black pixels in this area are not so detected.

The boundary condition checker 57 performs a boundary condition check like this. Moreover, in this embodiment, the boundary condition checker 57 checks only the left and right boundary conditions, but does not check the upper and lower boundary condition, as it can be understood on the basis of the construction shown in FIG. 19. The results of these boundary condition checks are transferred to the decoder 59.

The decoder 59 has a built-in logic circuit which determines whether or not the data for the four lines entered from selector 55 correspond to any of the intermediate spot patterns shown in FIGS. 2 through 5, and the data for the four lines entered from selector 55 are put into this logic circuit. This logic circuit judges whether or not the input data correspond to any of the intermediate spot patterns only when the logic circuit has received a detection signal from boundary condition checker 57, and when the logic circuit has found that the data correspond to an intermediate spot pattern. The logic circuit puts out the relevant object data in the input data as converted into data on the corresponding pixels in an output spot pattern corresponding to the intermediate spot pattern which has been found to have a proper correspondence. Moreover, in any other case, this logic circuit puts out the object data as they are without any such conversion.

As mentioned above, each time when the set of data for the four lines are put into decoder 59 synchronized with the select clock, the logic circuit mentioned above puts out the data of the object pixels after converting them in accordance with the output spot pattern as described above or as they are without any such conversion. The data of the object pixels which have been put out by the logic circuit in respect of the data set for the four lines of the four types are kept once in decoder 59, and, thereafter, decoder 59 puts out the converted data, provided that the data contain any data converted in accordance with the output spot pattern, but puts out the target data as they are when there is no converted data, as the ultimate object data in either case, to image signal modulating unit 61. Then, image signal modulating unit 61 modulates a laser driving signal, in accordance with the ultimate data entered on the object pixels, for the formation of an image to be printed out.

Next, a laser printer in a second preferred embodiment of the present invention will be described.

This preferred embodiment is a simplified system in a structure having a reduced number of variations of the intermediate spot patterns as compared with the preferred embodiment described abode.

Figures 20A, 20B, 21:
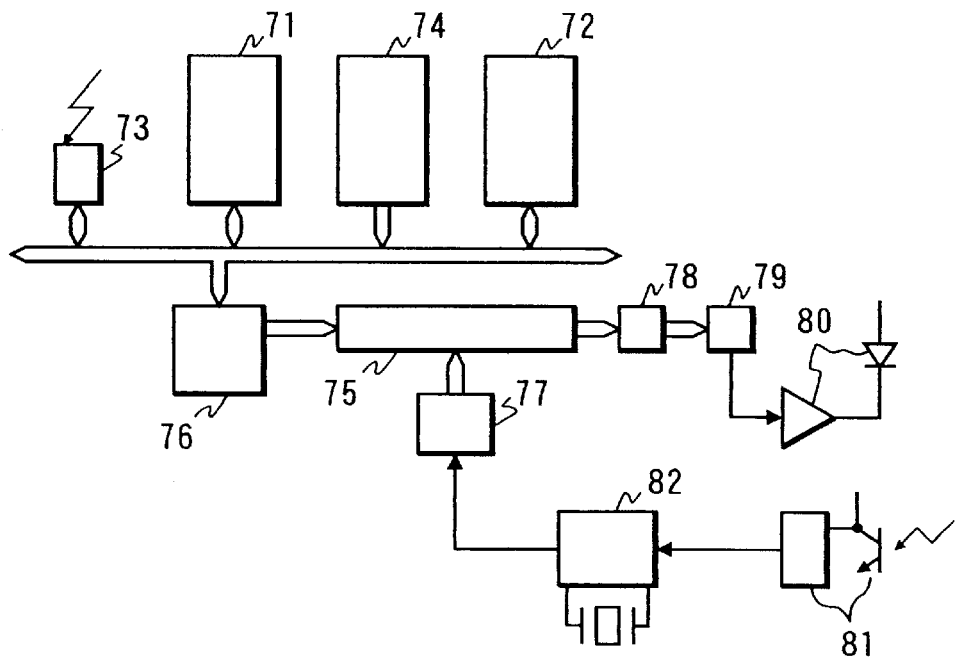
FIGS. 20(a) and 20(b) illustrate a specific example of a boundary condition check which the half-tone converting unit perform.
FIG. 21 is a block diagram illustrating a construction of the principal parts of a laser printer in a second example of preferred embodiment of the present invention.

FIG. 21 shows the construction of a data processing unit of a laser printer of the second preferred embodiment. As shown in FIG. 21, this printer is provided with main memory device 71, which stores image data and the like, central processing unit (CPU) 72, data receiving unit 73, which receives image data from the host computer, program memory device 74, which stores a program for giving commands to CPU 72 with respect to operations to be performed, line data buffer 75, which stores the data for adjacent four lines, a DMA device (hereinafter referred to as an image data DMA), which reads the image data out of main memory device 71 and transfers the data thus read to line data buffer 75, horizontal position counter 77, which specifies the position of the pixel to be put out of the line data buffer 75, pattern recognizing device 78, which recognizes a specific intermediate spot pattern from the pixel data read out of line data buffer 75 or from the data pattern of the pixels in the proximity of the pixel data, pixel signal modulating device 79, which modulates the signals in accordance with the result of a judgment made by pattern recognizing device 78, a set 80 of a laser light emitting diode and an amplifying unit, which generates a laser beam as scanned horizontally on a photosensitive material set in the laser printer, scanning start position detecting device 81, which detects the position for the start of a scanning operation with the laser beam, and clock generating unit 82, which generates a clock (hereinafter referred to as dot clock) in proportion to the intervals of the scanned pixels and supplies the generated clock to horizontal position counter 77.

Figure 22:
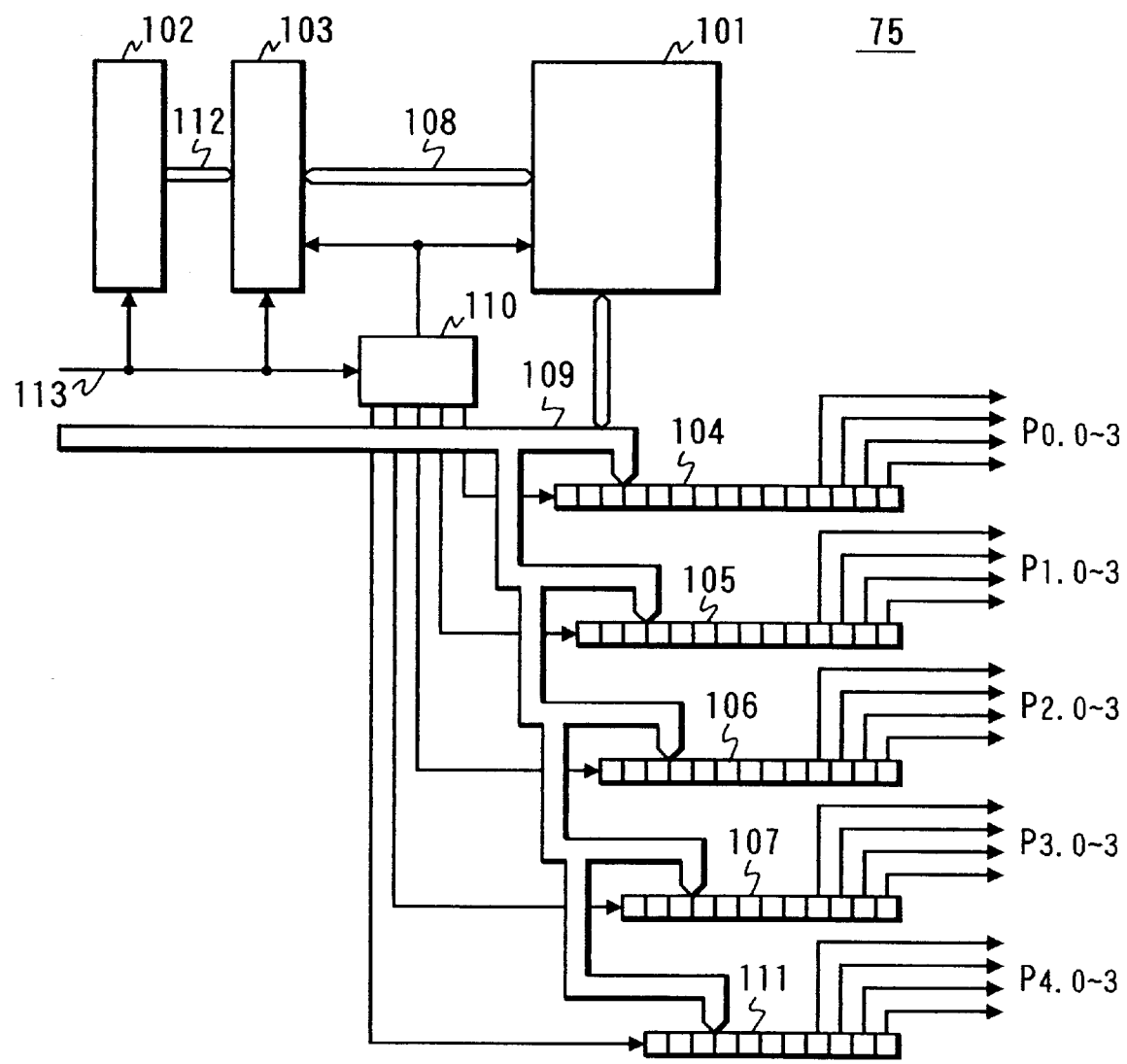
FIG. 22 is a block diagram illustrating the construction of a line data buffer in the laser printer in a second example of preferred embodiment of the present invention.

FIG. 22 is a block diagram illustrating the detailed construction of line-data buffer 75 in this embodiment.

In FIG. 22, the reference number 101 denotes a random access memory (hereinafter referred to as RAM), which is capable of writing and reading eight bits as one word at an arbitrarily selected address. The reference number 102 denotes a counter, which indicates the initial value of the RAM address at the time for the start of a scanning operation and performs a circulatory counting process for the scanning start position signal 113, applying 5 (the number of words in one line) as the divisor. The reference number 103 denotes an address counter, which counts the number of times of reading operations and the number of times of writing operations performed of RAM 101, and the count output 108 is to be connected to the address input for the RAM 101. The address counter 103 is initialized by the count output 112 from the initial address counter 102 with each scanning start position signal. On the RAM 101, reading operations are performed four times for every eight periods of the dot clock, and a writing operation is performed once for the data occupying the same horizontal position and constituting the latest line read by the image data DMA 76 out of main memory device 71. The reference number 110 denotes a shift register number counter, which performs a circulatory counting process on the number of times of the reading operations and the number of times of the writing operations performed of the RAM 101, applying 5 as the divisor. This shift register number counter 110 will be initialized to zero by a scanning start position signal.

The reference numbers 104, 195, 106, and 107 and 111 are registers for 16 bits, 15 bits, 14 bits, 13 bits, and 13 bits, respectively, and these registers shift the data to an upper stage by one bit at each time in every one period of the dot clock. Moreover, the least significant eight bits of each shift register as indicated by the shift register number counter 110 will be initialized by the value of a RAM data input output bus 109 at the time of a reading operation or a writing operation performed on RAM 101.

In the construction described above, the bit arrangements P0 to 4 and 0 to 3 in an area composed of five pixels by four pixels including the pixels corresponding to the output position can be read at a real time at each dot clock out of the bit arrangements in which the most significant four bits for each shift register are arranged.

FIG. 23 presents a table showing the intermediate spot patterns to be detected by the printer and the output spot patterns corresponding to the intermediate spot patterns. The difference between the intermediate spot pattern and the output spot pattern is set in such a manner that it can be contained within three pixels in a difference in pattern and within one pixel in a difference in density, in the same way as in the embodiment described above. Owing to this feature, only a side effect at an almost non-recognizable level will occur, if at all, when the diameter of one dot is as small as 40 $\mu m^2$, even if a converting operation has been erroneously performed on any portion not intended for any conversion. Further, since the black pixel pattern enclosed by a white area in an MGT spot is specified as an intermediate spot pattern, no conversion at all will be made, and no side effect will therefore be produced, in respect of a continuous boundary line, such as a straight line, a curved line, an edge of a letter, or the like, which are liable to the most conspicuous side effects produced by erroneous conversion.

Figure 24:
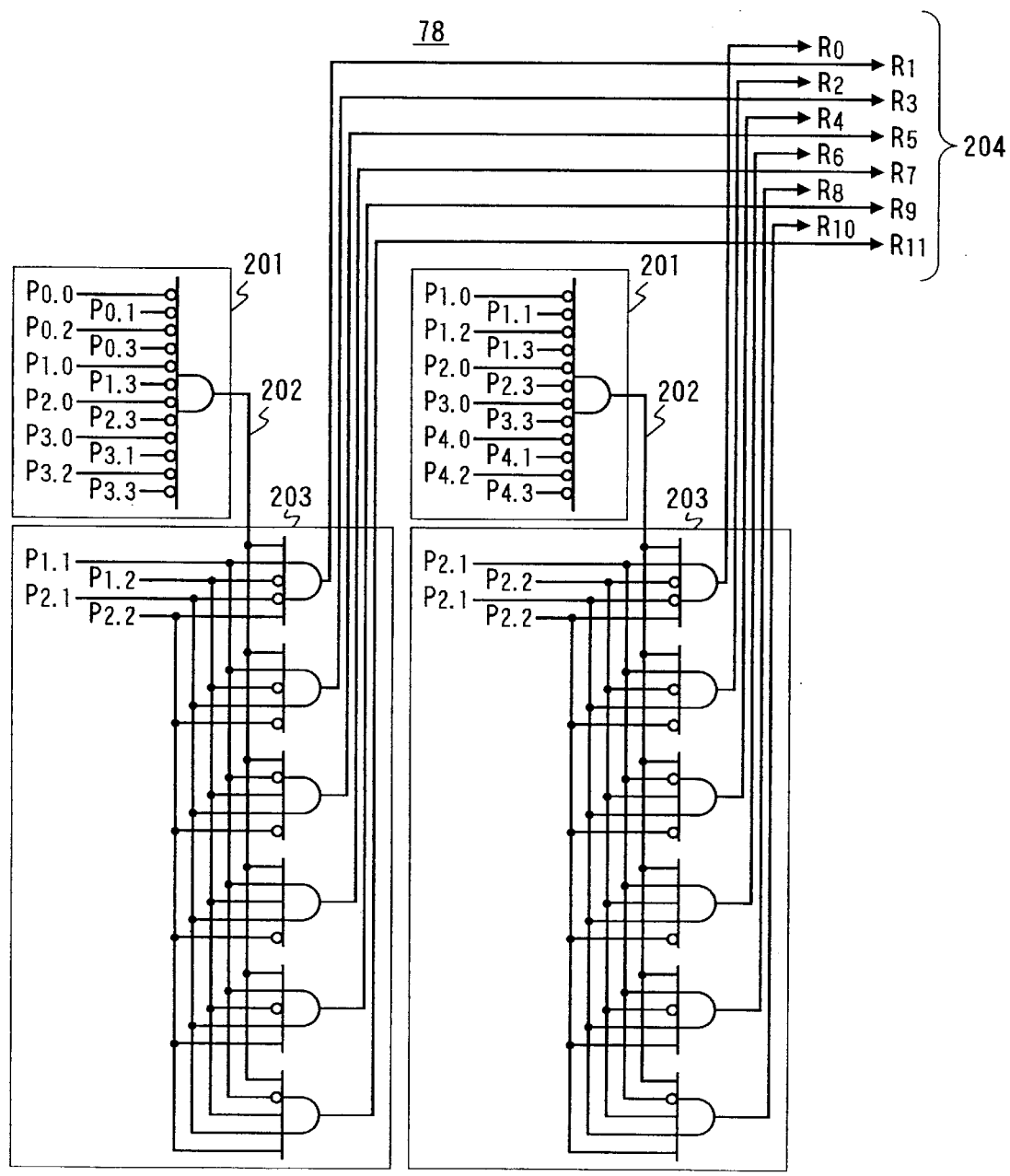
FIG. 24 is a block diagram illustrating a construction of a pattern recognizing unit in the laser printer in a second example of preferred embodiment of the present invention.

FIG. 24 is a circuit diagram illustrating an example of the circuitry of pattern recognizing device 78.

As shown in FIG. 23, the pixels which, being contained in an intermediate spot pattern, are to be subjected to a conversion into an output spot pattern extend on two lines, and the pattern recognizing device 78 is composed of two circuits, namely, two pattern detecting circuits each for one of the two lines.

The reference number 201 is a circuit for identifying white pixels in an MGT spot common to all the intermediate spot patterns, and this circuit generates "1" if the condition is true, but generates "0" if the condition is false, in the identified result output 202. The reference number 203 denotes a decoding circuit for a portion unique to each intermediate spot pattern. All the decoded output from this decoding circuit is processed for its multiplication with the identified result output 202 to find a product thereof, and, if the identified result output 202 is false, each and all of the decoded outputs will be false. Pattern recognizing device 78 puts out the decoded output 204 to the image modulating device 79.

Figure 25:
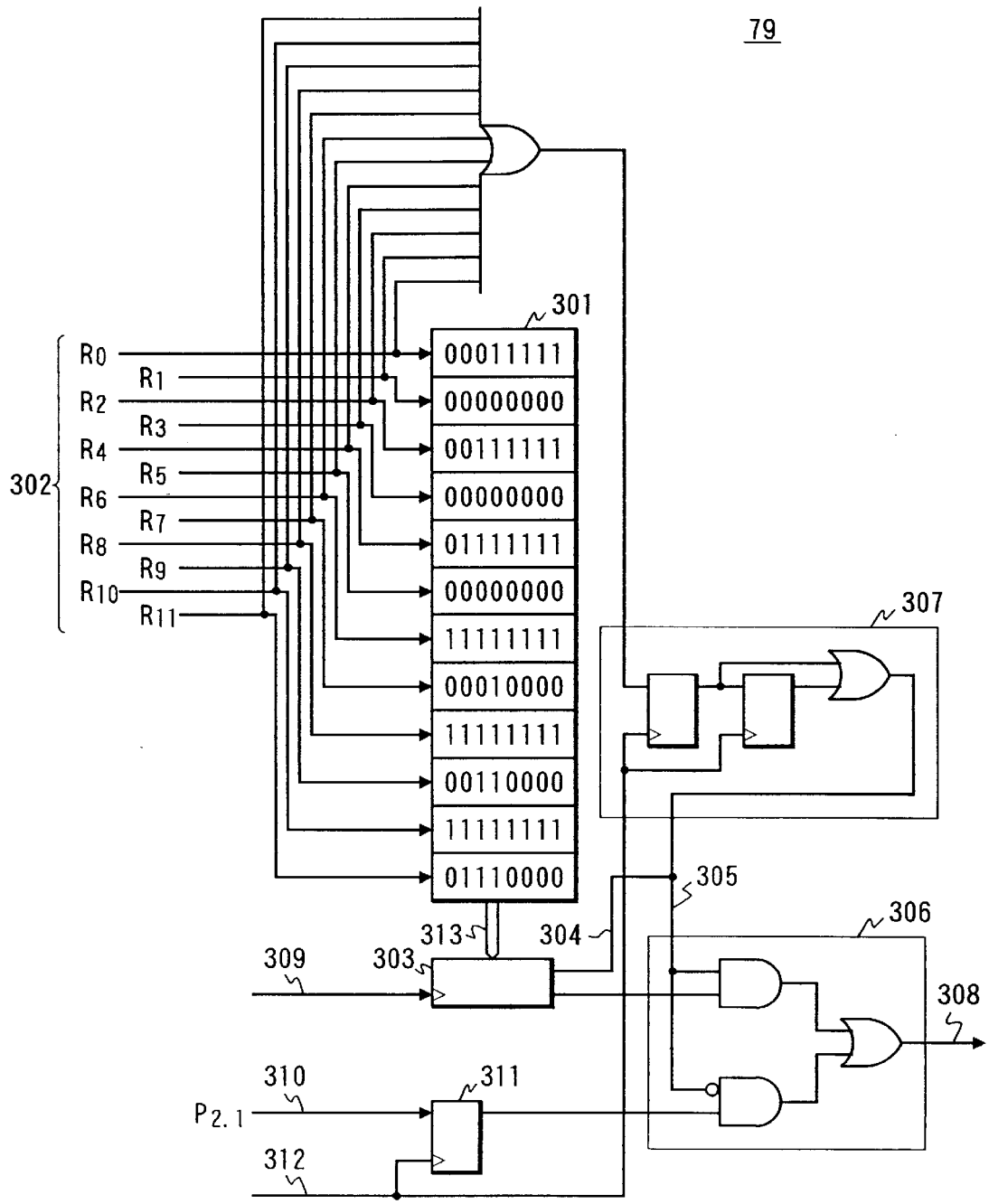
FIG. 25 is a block diagram illustrating a construction of an image signal modulating device in the laser printer in a second example of preferred embodiment of the present invention.

FIG. 25 is a block diagram illustrating the image signal demodulating device 79.

The reference number 301 denotes a ROM. The decoding signal 302, which is put out of the pattern recognizing device 78, is applied to a line selecting signal, and the corresponding output spot pattern data (in eight bits) which are stored in each line are read out. The reference number 303 denotes an eight-bit shift register, and a shift operation is performed by a shift clock 309, which has a period of ¼ of the data transfer period for one dot (hereinafter referred to as fourfold clock), during the period in which the shift operation specifying input 304 is true. Further, the shift register 303 will always be initialized to assume the value of the ROM data bus 313 whenever the shift operation specifying input 304 is false.

The shift operation specifying input 304 receives as an input a signal which is obtained by delaying the logical sum of all the decoded signals by a portion for one period of the dot clock 312 by a pulse width expanding circuit 307 and then extending the period of "true" to a period equivalent to two periods of the dot clock. The signal is put also into the select input 305 of the selector 306, and, when the select input 305 is true, the selector 306 selects the output from the shift register 303, but, when the select input 305 is false, the selector 306 selects a signal which has been obtained by delaying the pixel values P2 and 1 corresponding to the output positions by one period of the dot clock by means of a D-type master-slave flip-flop 311. This signal is put out as a modulated signal to a modulated signal output 306. This modulated signal drives the laser light emitting diode 60.

Next, a modified structure of the second preferred embodiment of the present invention will be described.

Figure 26:
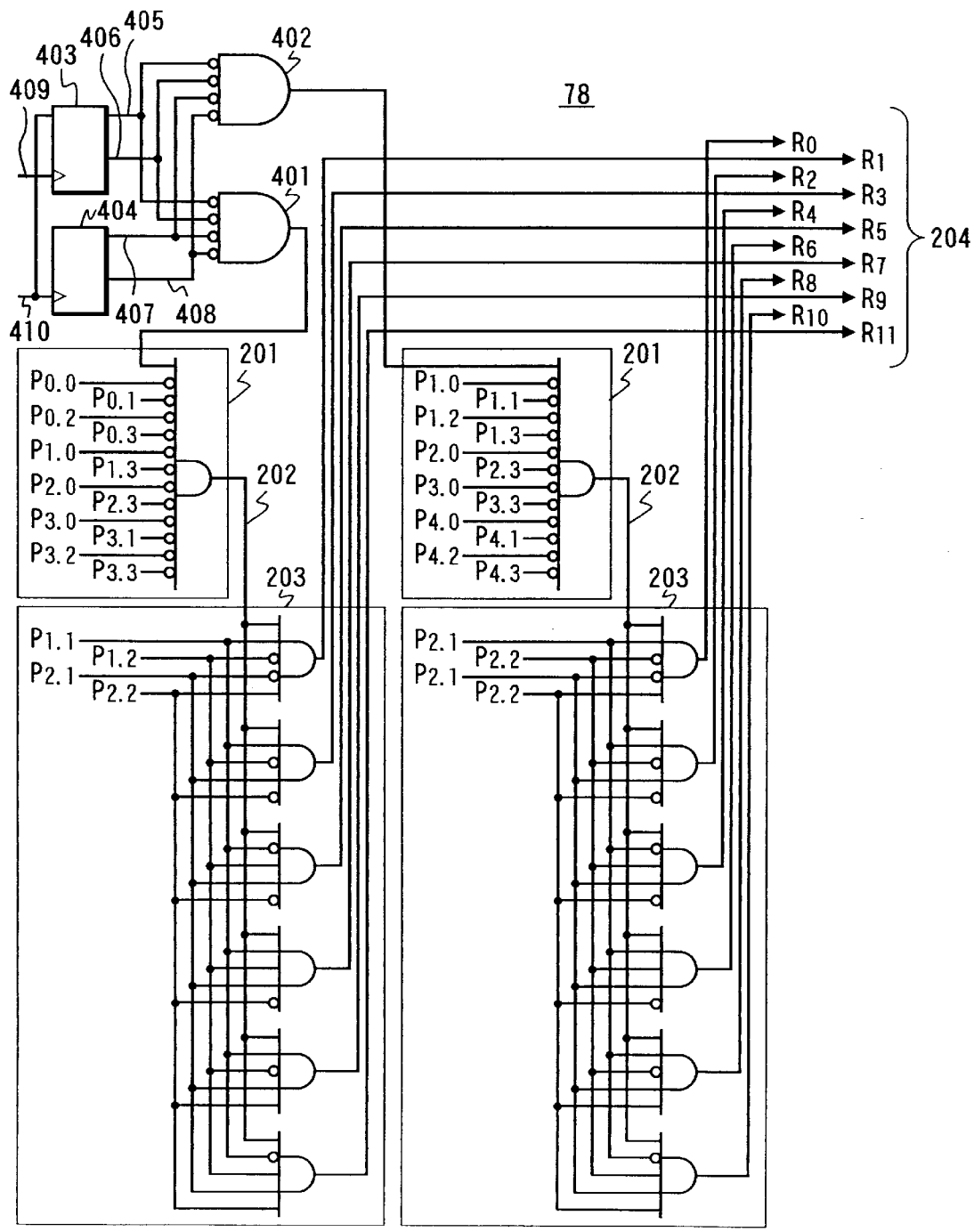
FIG. 26 is a block diagram illustrating a construction of a pattern recognizing device in a modified structure of a second example of preferred embodiment of the present invention.

FIG. 26 illustrates the construction of a pattern recognizing device in this modified structure. This pattern recognizing device has an output position detecting circuit added to the construction shown in FIG. 24. In the following part a, description will be made of the pattern recognizing device chiefly with reference to the construction of this output position detecting circuit.

The reference number 403 denotes a counter which performs a circulatory counting process with a dot clock 409 (hereinafter referred to as a horizontal position counter), applying 4 as the divisor. The horizontal position counter 403 will be initialized to zero by a scanning position start signal. The less significant portion of the count output of this horizontal position counter 403 is indicated by the reference number 405 while the more significant portion of the count output is indicated by the reference number 406.

The reference number 404 is a counter which performs a circulatory counting process, applying 4 as the divisor, on horizontal synchronizing signals generated for image reading from the line buffer 75 (hereinafter referred to as a vertical position counter). The horizontal position counter 404 will be initialized at the time of the start of a printing operation. The less significant portion of the count output from this horizontal position counter 404 is indicated by the reference number 407 while the more significant portion of the count output is indicated by the reference number 408.

The reference number 402 denotes a logical product element, which judges whether or not the positions of the coordinates for the output P0 and 0 from the line buffer are any multiple of 4 both in the horizontal direction and in the vertical direction, and the reference number 401 is another logical product element, which judges whether or not the positions of the coordinates for the output P1, 0 from the line buffer 75 is any multiple of 4 both in the horizontal direction and in the vertical direction.

The construction described in this modified example is capable of increasing the number of the MGT spot patterns as compared with the earlier example of embodiment, as shown in FIG. 27 (i.e., an increase in the number of spot patterns corresponding to ¼ to ¾ in density) by applying the logical product output of the detected output from these two logical product elements 401 and 402 and the identified output from the two identifying circuits 201 and 201 mentioned above as an input to the decoding circuits 203 and 203 mentioned above.

FIG. 28 shows an image signal modulating device in another modified structure of the second embodiment. The image signal modulating device is formed in a construction with a converting area limiting circuit added to the construction shown in FIG. 25. In the following part, a description will be made of this image signal modulating device chiefly with reference to this converting area limiting circuit.

The reference number 505 denotes a DMA device (which will be hereinafter referred to as the mask data DMA), which transfers one word of mask data to the shift register 501 each time the shift register 501 consumes one word. The reference number 503 denotes an initializing signal for the shift register 501, and the reference number 504 denotes an initializing data bus.

Here, the mask data mentioned above means the data which express a prescribed mask pattern in 1 to 1 correspondence for every pixel in the image data to be taken as the object of a conversion, and mask data in the value "1" indicate a conversion of the corresponding pixels of the image data, and mask data in the value "0" indicate that no conversion of the image data is to be performed.

The shift register 501 performs a shift operation for every one dot clock and puts out the mask data one bit at a time. With the logical product of the bit of the mask data thus put out and the output from the pulse extending circuit 307 being used anew as a select signal, it is possible to cause a conversion not to be made of an area which has a shape in agreement with the mask pattern. Owing to this feature, it is possible surely to eliminate the side effects due to a modulation.

Further, a similar function as this can be realized by such a method as providing a line dot counter and comparing the counted value with a value set in advance, thereby detecting an area to be converted.

The examples of preferred embodiments described above are applied to a laser beam printer, but it goes without saying that a similar effect can be produced by using a similar circuit to the control of an electron beam in a cathode ray display tube unit or the like.

As described above, the present invention makes it possible to express multiple tonal ranges with a small amount of data.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated, it is intended that the scope of the invention be defined by the claims appended hereto, and their equivalents.

What is claimed is:

1. A multiple tonal range image processing system for converting a gray scale image into a half-tone image having a spot area composed of a prescribed plural number of pixels for an expression of an image in multiple tonal ranges and for physically expressing the half-tone image by an output device, comprising:

rasterizing means for generating a raster image in which pixels have one of a plurality of prescribed binary value densities corresponding to a gray level of corresponding pixels in the gray scale image; and half-tone converting means for detecting a spot area, corresponding to one of a plurality of intermediate spot patterns, from the raster image and converting the one of a plurality of intermediate spot patterns detected into a corresponding one of a plurality of output spot patterns, the plurality of intermediate spot patterns being those spot patterns which logically express a prescribed number of multiple tonal ranges with a combination of those pixels which can assume only binary values and also in a varied arrangement of pixels, and the plurality of output spot patterns being spot patterns which actually express the prescribed number of multiple tonal ranges with a combination of pixels which can assume tertiary or more values of a density, wherein the pixels are directly expressed by the output device.

2. The multiple tonal range image processing system as defined in claim 1, wherein the rasterizing means includes a dither matrix, having the detected spot area located in a prescribed position in a process in which the rasterizing means converts the gray scale image into the raster image, and isolates individual intermediate spot patterns as much as possible on the raster image.

3. The multiple tonal image processing system as defined in claim 2, wherein the dither matrix includes:

a maximum threshold value matrix, which determines maximum threshold values for individual pixels for setting the gray level at a larger one of the binary value densities, and a minimum threshold value matrix, which determines minimum threshold values for individual pixels for setting the gray level at a smaller one of the binary value densities, either of the maximum threshold values and the minimum threshold values having a smaller value for pixels within the detected spot area than a value for the pixels outside the detected spot area.

4. The multiple tonal range image processing system as defined in claim 2, wherein the dither matrix includes:

a maximum threshold value matrix, which determines maximum threshold values for individual pixels for setting the gray level at a larger one of the binary value densities, and a minimum threshold value matrix, which determines the minimum threshold values for individual pixels for setting the gray level at a smaller one of the binary value densities, wherein the maximum threshold values and the minimum threshold values are determined so that the maximum threshold values are larger than the minimum threshold values for at least some pixels in the detected spot area and that both of the threshold values being identical for any pixels other than those in the detected spot area, and wherein the rasterizing means selects an intermediate spot pattern corresponding to a representative gray level in the detected spot area out of the plurality of intermediate spot patterns when any pixel in the detected spot area has an intermediate gray level the density of which cannot be determined on a basis of either of the maximum threshold value matrix and the minimum threshold value matrix, and determines the density of a pixel having an intermediate gray level in accordance with the selected intermediate spot pattern.

5. The multiple tonal range image processing system as defined in claim 4, wherein the rasterizing means selects a gray level of a prescribed pixels in a neighborhood of a central position in the detected spot area and using the selected gray level as a representative gray level.

6. The multiple tonal range image processing system as defined in claim 2, wherein a plurality of dither matrixes are prepared in advance corresponding to a plurality of arrangements different in density in the detected spot area on the raster image, each of the plurality of dither matrixes is predetermined in accordance with a condition in which a usable type of the plurality of intermediate spot patterns is limited to a type belonging to a prescribed small range of densities, so that the plurality of intermediate spot patterns will be isolated on the raster image under an arrangement of the corresponding detected spot area, and the rasterizing means converts the gray scale image into the raster image, selectively using one of the plurality of dither matrixes.

7. The multiple tonal range image processing system as defined in claim 6, wherein the plurality of dither matrixes includes a maximum threshold value matrix, which determines maximum threshold value for individual pixels for setting the gray level at a larger one of the binary value densities, and a minimum threshold value matrix, which determines minimum threshold values for the individual pixels for setting the gray level at a smaller one of the binary value densities, the maximum threshold values and the minimum threshold values being determined so that the maximum threshold values are larger than the minimum threshold values for at least some pixels in the detected spot area and the threshold values being identical for pixels other than those in the detected spot area, and the rasterizing means selects an intermediate spot pattern corresponding to a representative gray level in the detected spot area out of the plurality of intermediate spot patterns when any pixel in the detected spot area has any intermediate gray level a density of which cannot be determined on a basis of either of the maximum threshold value matrix and the minimum threshold value matrix, and determines the density of a pixel having the intermediate gray level in accordance with the intermediate spot pattern thus selected.

8. The multiple tonal range image processing system as defined in claim 1, wherein the spot area comprises a prescribed central area and a prescribed peripheral area, and the pixel arrangement changes in accordance with changing the tonal expressed by the intermediate spot patterns such that the pixels to be changed are of either one of the prescribed central area or the prescribed peripheral area when the tonal value changes by one.

9. The multiple tonal range image processing system as defined in claim 1, wherein each of the intermediate spot patterns is data defined by bits the number of which is the same as the number of pixels of the spot area, and each of the output spot patterns is data defined by bits the number of which is two or more integer times the number of pixels of the spot area.

10. The multiple tonal range image processing system as defined in claim 1, wherein a difference between the density actually represented by the intermediate spot pattern and the density actually represented by the corresponding output spot pattern is within one pixel.

11. A multiple tonal range image processing system for converting a gray scale image into a half-tone image having a spot area of a prescribed plurality of pixels for multiple tonal range expression and for physically expressing the half-tone image by an output device, comprising:

rasterizing means for generating a raster image of a corresponding pixel of which has one of a prescribed binary value densities in accordance with a gray level of the pixels in the gray scale image; and half-tone converting means for detecting a spot area having one of a plurality of intermediate spot patterns out of the raster image and converting the one of a plurality of intermediate spot patterns of the detected spot area into a corresponding one of the plurality of output spot patterns, wherein the plurality of output spot patterns are spot patterns actually expressing a prescribed plurality of multiple tonal ranges by combining pixels which can take tertiary or more values of density, the pixels being directly expressed by the output device, and wherein the plurality of intermediate spot patterns are spot patterns which logically express the plurality of multiple tonal ranges by combining pixels which can take only binary value densities and also by varying the arrangement of the pixels.

12. A multiple tonal range image processing system for converting a gray scale image into a half-tone image having a spot area of a prescribed plurality of pixels for multiple tonal range expression and for physically expressing the half-tone image by an output device, comprising:

a dither matrix having the spot located in a prescribed position;

a plurality of spot patterns which are formed by combining pixels which can take only prescribed binary value densities and logically express tonal ranges in a number larger than a maximum number of pixels combined by varying the arrangement of the pixels;

first rasterizing means for converting a gray level of pixels located at least in an outside of the detected spot area in the gray scale image into the binary value densities using the dither matrix; and second rasterizing means for converting a gray level of at least some pixels located in the detected spot area in the gray scale image into the binary value densities using the detected spot pattern, wherein the pixels are directly expressed by the output device.

13. The multiple tonal range image processing system as defined in claim 12, wherein the spot area comprises a prescribed central area and a prescribed peripheral area, and the pixel arrangement changes in accordance with changing the tonal expressed by the intermediate spot patterns such that the pixels to be changed are of either one of the prescribed central area or the prescribed peripheral area when the tonal value changes by one.

14. A multiple tonal range image processing method for converting a gray scale image into a raster image having a spot area composed of a prescribed plural number of pixels for an expression of an image in multiple tonal ranges and for physically expressing the half-tone image by an output device, comprising the steps of:

providing a dither matrix, the dither matrix having the detected spot area located in a prescribed position;

providing plural spot patterns which logically express the number of multiple tonal ranges with a combination of those pixels which can assume only binary values and also in a varied arrangement of pixels, wherein the number of multiple tonal ranges is larger than the number of pixels;

converting a gray level into binary values by use of the dither matrix, wherein the gray level to be converted is of the pixels positioned outside the detected spot area in the gray scale image; and converting a gray level into binary values by use of the dither matrix, wherein the gray level to be converted is of the pixels positioned inside the detected spot area in the gray scale image, wherein the pixels are directly expressed by the output device.

15. A print system in which a host computer is connected to a printer, a gray scale image in the host computer is converted into a half-tone image having a spot area defined by a prescribed plural number of pixels for an expression of an image in multiple tonal ranges and the half-tone image is physically expressed by an output device, the print system comprising:

rasterizing means for generating a raster image in which pixels have one of a plurality of prescribed binary value densities corresponding to a gray level of corresponding pixels in the gray scale image, the rasterizing means being formed in the host computer; and half-tone converting means for receiving the raster image from the rasterizing means, detecting a spot area, corresponding to one of a plurality of intermediate spot patterns, from the raster image and converting the one of a plurality of intermediate spot patterns detected into a corresponding one of a plurality of output spot patterns, the half-tone converting means being formed in the printer, wherein, the plurality of intermediate spot patterns logically express a prescribed number of multiple tonal ranges with a combination of those pixels which can assume only binary values and also in a varied arrangement of pixels, and the plurality of output spot patterns actually express the prescribed number of multiple tonal ranges with a combination of pixels which can assume tertiary or more values of a density, the pixels being directly expressed by the output device.

16. A printer driver installed in a computer for converting a gray scale image into a raster image having a spot area composed of a prescribed plural number of pixels for an expression of an image in multiple tonal ranges and for physically expressing the half-tone image by an output device, the printer driver comprising:

a dither matrix having a detected spot area located in a prescribed position;

plural spot patterns being those spot patterns which logically express the number of multiple tonal ranges with a combination of those pixels which can assume only binary values and also in a varied arrangement of pixels, wherein the number of multiple tonal ranges is larger than the number of pixels;

rasterizing means for converting a gray level into the binary values by use of the dither matrix, wherein the gray level to be converted is of the pixels positioned outside the detected spot area in the gray scale image; and rasterizing means for converting a gray level into the binary values by use of the dither matrix, wherein the gray level to be converted is of the pixels positioned inside the detected spot area in the gray scale image, wherein the pixels are directly expressed by the output device.

17. A computer program embodied in computer-readable medium for executing on a computer to convert a gray scale image inside the computer into a raster image having a spot area composed of a prescribed plural number of pixels for an expression of an image in multiple tonal ranges and to physically express the half-tone image by an output device, wherein the computer program comprising the steps of:

providing a dither matrix, the dither matrix having the detected spot area located in a prescribed position;

providing plural spot patterns being those spot patterns which logically express the number of multiple tonal ranges with a combination of those pixels which can assume only binary values and also in a varied arrangement of pixels, wherein the number of multiple tonal ranges is larger than the number of pixels;

converting a gray level into the binary values by use of the dither matrix, wherein the gray level to be converted is of the pixels positioned outside the detected spot area in the gray scale image; and converting a gray level into the binary values by use of the dither matrix, wherein the gray level to be converted is of the pixels positioned inside the detected spot area in the gray scale image, wherein the pixels are directly expressed by the output device.

18. A printer driver installed in a computer in which a gray scale image in the computer is converted into a half-tone image having a spot area defined by a prescribed plural number of pixels for an expression of an image in multiple tonal ranges, the print system comprising:

rasterizing means for generating a raster image in which pixels have one of a plurality of prescribed binary value densities corresponding to a gray level of corresponding pixels in the gray scale image, the raster image including a plurality of intermediate spot patterns, wherein, the plurality of intermediate spot patterns logically express a prescribed number of multiple tonal ranges with a combination of those pixels which can assume only binary values and also in a varied arrangement of pixels, and a difference between the actually expressed density and the logically expressed density by the intermediate spot pattern is within one pixel.

19. A computer program embodied on computer-readable medium for executing on a computer to convert a gray scale image in the computer into a half-tone image having a spot area defined by a prescribed plural number of pixels for an expression of an image in multiple tonal ranges, the computer program comprising the steps of:

generating a raster image in which pixels have one of a plurality of prescribed binary value densities corresponding to a gray level of corresponding pixels in the gray scale image, the raster image including a plurality of intermediate spot patterns;

converting the plurality of intermediate spot patterns to a plurality of output spot patterns to form an actual output image, wherein the plurality of intermediate spot patterns logically express a prescribed number of multiple tonal ranges with a combination of those pixels which can assume only binary values and also in a varied arrangement of pixels, and a difference between the actually expressed density and the logically expressed density by the intermediate spot pattern is within one pixel.

* * * * *